(12) United States Patent
Hasegawa et al.

(10) Patent No.: US 8,055,084 B2
(45) Date of Patent: Nov. 8, 2011

(54) IMAGE PROCESSING DEVICE, IMAGE COMPRESSION METHOD, IMAGE COMPRESSION PROGRAM, AND RECORDING MEDIUM

(75) Inventors: Fumihiro Hasegawa, Tokyo (JP); Shinji Yamakawa, Kanagawa (JP); Hitoshi Itoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 947 days.

(21) Appl. No.: 11/492,771

(22) Filed: Jul. 26, 2006

(65) Prior Publication Data

US 2007/0025627 A1    Feb. 1, 2007

(30) Foreign Application Priority Data

Jul. 27, 2005 (JP) .................. 2005-217559
Jan. 30, 2006 (JP) .................. 2006-021143

(51) Int. Cl.
*G06K 9/36* (2006.01)
(52) U.S. Cl. .......... 382/232; 382/239; 358/434
(58) Field of Classification Search .......... 382/232, 382/100, 101, 103, 108, 181, 137, 124, 195
See application file for complete search history.

(56) References Cited

U.S. PATENT DOCUMENTS

| | | | |
|---|---|---|---|
| 6,173,088 B1 * | 1/2001 | Koh et al. ............ | 382/289 |
| 6,441,913 B1 * | 8/2002 | Anabuki et al. ........ | 358/1.12 |
| 6,483,609 B1 * | 11/2002 | Ueno et al. .......... | 358/434 |
| 2003/0228063 A1 | 12/2003 | Nakayama et al. | |

FOREIGN PATENT DOCUMENTS

| | | |
|---|---|---|
| JP | 5-145768 | 6/1993 |
| JP | 6-14213 | 2/1994 |
| JP | 6-197218 | 7/1994 |
| JP | 8-65530 | 3/1996 |
| JP | 10-155076 | 6/1998 |
| JP | 2791314 | 6/1998 |
| JP | 11-164151 A | 6/1999 |
| JP | 2000-50268 A | 2/2000 |
| JP | 2000-324338 | 11/2000 |
| JP | 2001-358950 | 12/2001 |
| JP | 2002-10094 | 1/2002 |
| JP | 2002-176564 A | 6/2002 |
| JP | 2002-368986 | 12/2002 |
| JP | 3395691 | 2/2003 |
| JP | 2003-259115 | 9/2003 |
| JP | 2003-264694 | 9/2003 |
| JP | 2003-274196 | 9/2003 |
| JP | 2004-215093 | 7/2004 |

OTHER PUBLICATIONS

Office Action for Japanese Patent Application No. 2006-021143, dated May 19, 2011.
Office Action issued Mar. 8, 2011, in Japanese Patent Application No. 2006-021143.

* cited by examiner

*Primary Examiner* — Samir Ahmed
*Assistant Examiner* — Ruiping Li
(74) *Attorney, Agent, or Firm* — Oblon, Spivak, McClelland, Maier & Neustadt, L.L.P.

(57) ABSTRACT

In an image processing device which compresses image data which is created by electronizing of a document, to generate compressed image data, a document type judgment unit determines a type of document from the image data. An image compression unit performs a compression encoding of the image data based on a result of the determination of the document type judgment unit.

14 Claims, 18 Drawing Sheets

|  | CHROMATIC DOC. JUDGMENT | CHARACTER DOC. JUDGMENT | PRINTING PAPER PHOTO. JUDGMENT | PRINTING PHOTO. JUDGMENT |
|---|---|---|---|---|
| BLACK-CHARACTER DOCUMENT | NO | YES | NO | NO |
| GRAY DOCUMENT | NO | — | YES FOR EITHER | |
| CHARACTER DOCUMENT | YES | YES | NO | NO |
| COLOR DOCUMENT | YES | — | YES FOR EITHER | |

FIG.13

|  | OUTPUT IMAGE | RESOLUTION CONVERSION-A UNIT | RESOLUTION CONVERSION-B UNIT |
|---|---|---|---|
| BLACK-CHARACTER DOCUMENT | BINARY | NO | NO |
| GRAY DOCUMENT | BINARY, BACK, FORE | YES | YES |
| CHARACTER DOCUMENT | BINARY, BACK, FORE | YES | YES |
| COLOR DOCUMENT | BINARY, BACK, FORE | YES | YES |

FIG.17

|  | CHROMATIC | ACHROMATIC |
|---|---|---|
| CHARACTER DOCUMENT | COLOR COMPRESSION | BINARY COMPRESSION |
| PHOTOGRAPHIC DOCUMENT | COLOR COMPRESSION | COLOR COMPRESSION |

IMAGE PROCESSING DEVICE, IMAGE COMPRESSION METHOD, IMAGE COMPRESSION PROGRAM, AND RECORDING MEDIUM

BACKGROUND OF THE INVENTION

1. Field of the Invention

The present invention relates to an image processing device, an image compression method, a computer-readable image compression program, and a computer-readable recording medium which carry out compression encoding of image data.

2. Description of the Relater Art

The size of image data generally is large, and conventionally, various image processing methods for carrying out compression encoding of image data to reduce the size of image data have been proposed. Reduction of the size of image data enables effective utilization of hardware resources, and the loads of a network where the image data is transmitted can be reduced.

For example, Japanese Patent No. 2791314 (which is called reference 1) discloses an image processing method wherein it is detected whether the document is a color document or a monochrome document, and a method of compressing image data of the document is changed according to a result of the detection.

Japanese Published Patent Application No. 06-014213 (which is called reference 2) or Japanese Laid-Open Patent Application No. 2002-010094 (which is called reference 3) discloses an image processing method wherein it is detected whether the document is a color document or a monochrome document, and a printing unit for printing an image of the document to paper is changed according to a result of the detection.

Japanese Laid-Open Patent Application No. 10-155076 (which is called reference 4) discloses an image processing method wherein it is detected whether the document is a color document or a monochrome document, it is also detected whether the document contains a photographic image, and a printing unit for printing an image of the document to paper is changed according to a result of the detection.

Japanese Laid-Open Patent Application No. 08-065530 (which is called reference 5) discloses an image processing method wherein it is detected whether the document is a color document or a monochrome document, and a printing unit for printing an image of the document to paper is changed according to a result of the detection.

Japanese Laid-Open Patent Application No. 06-197218 (which is called reference 6) discloses an image processing method wherein it is detected at the time of pre-scanning of a document whether the document contains a pattern of silver-salt film photograph or a pattern of halftone dot photograph, or contains both the patterns, and a group of color correction coefficients is changed based on a result of the detection, so that the optimal color correction is performed.

Japanese Laid-Open Patent Application No. 2001-358950 (which is called reference 7) or Japanese Laid-Open Patent Application No. 2000-232589 (which is called reference 8) discloses an image processing method wherein the image format is changed according to a kind of destination transmission device.

Japanese Laid-Open Patent Application No. 09-247419 (which is called reference 9) discloses an image processing method wherein the transmitting image format is changed according to whether the document is a color document or a monochrome document. Also disclosed is that when the document type is detected as being a copy document by the document type judgment, the printing of a trace pattern is not performed.

However, in the case of reference 1, even when the document is a monochrome document, the compression method which is suitable for the document is varied depending on whether the document contains a photograph or not.

For example, if binarization of a monochrome image containing no photograph is performed and the MMR (modified modified relative-element-address-designate) compression encoding is performed, the quality of image does not deteriorate and the compression efficiency is adequate. However, in the case of a monochrome image containing a photograph, if the same compression method is performed, fine noises remain in the photographic area of a copy and the quality of image deteriorates sharply.

In the cases of references 2 through 5, the compression efficiency is not taken into consideration.

When an irreversible compression method, such as the compression of JPEG (joint photographic experts group) files, is performed, it is possible to generate a file of compressed image data with a small size and obtain a high compressibility. This JPEG method is effective to images containing patterns, but it is not suitable for compression of binary images, like character images. If the JPEG method is performed for binary images, the edges of characters will fade and the readability of characters will deteriorate.

To obviate the problem, an image processing method as disclosed in Japanese Laid-Open Patent Application No. 2002-368986 (which is called reference 10) or Japanese Patent No. 3193086 (which is called reference 11) has been proposed. In this image processing method, the image data is separated into a first image plane (pattern area), a second image plain (color information of character area), and a selection image plain (shape of character area). A resolution of each of these image planes is converted by the three resolution conversion parts respectively. The image planes after the conversion of resolution are compressed by the three compression parts respectively and they are combined into one file. It is possible to maintain a high resolution of the character area and creates a high compressibility of the pattern area.

However, when the document is a monochrome document with only characters, the multi-level image data of the two image planes is unnecessary, and the compression efficiency will deteriorate. In the case of a monochrome document with only characters, if the binarization is performed and the MMR compression is performed, the compression efficiency is adequate and the quality of image is appropriate. However, in the case of a color document, if the MMR compression is performed, the color is lost and such a compression method is not practical. In addition, at the time of the binarization, noises may remain in the photographic area of a copy, and the compressibility in such a case will deteriorate.

SUMMARY OF THE INVENTION

According to one aspect of the invention, there is provided an improved image processing device in which the above-described problems are eliminated.

According to one aspect of the invention, there is provided one of an image processing device, an image compression method, an image compression program, and a recording medium which are adapted to suppress degradation of the quality of a compressed image as much as possible and to attain high compressibility.

In an embodiment of the invention which solves or reduces one or more of the above-mentioned problems, there is provided an image processing device which compresses image data which is created by electronizing of a document, to generate compressed image data, the image processing device comprising: a document type judgment unit determining a type of document from the image data; and an image compression unit performing a compression encoding of the image data based on a result of the determination of the document type judgment unit.

The above-mentioned image processing device may be configured so that the document type judgment unit comprises: a first judgment unit determining whether the document is a document containing only characters or characters and line drawings; and a second judgment unit determining whether the document is a chromatic document.

The above-mentioned image processing device may be configured so that the image processing device further comprises: a resolution conversion unit converting a resolution of the image data; a separation unit separating the image data into binary image data and multi-level image data, based on a result of the determination of the document type judgment unit; a binary image compression unit performing a compression encoding of the binary image data; a multi-level image compression unit performing a compression encoding of the multi-level image data; and an image file combining unit outputting as the compressed image data a compressed image data generated by the binary image compression unit or the multi-level image compression unit.

The above-mentioned image processing device may be configured so that the image compression unit comprises: a first image compression unit including a layer separating unit separating an input image of the document into a plurality of layers, and a first compression encoding unit performing a compression encoding of each of the plurality of layers respectively; and a second image compression unit including a binarization unit generating a binary image from the input image, and a second compression encoding unit performing a compression encoding of the binary image.

The above-mentioned image processing device may be configured so that the document type judgment unit comprises: a first judgment unit determining whether the document is a document containing only characters or characters and line drawings; and a second judgment unit determining whether the document is a chromatic document, wherein, when it is determined that the document is a document containing only characters or characters and line drawings and is not a chromatic image, the second image compression unit performs the compression encoding of the binary image, and otherwise the first image compression unit performs the compression encoding of each of the plurality of layers respectively.

The above-mentioned image processing device may be configured so that at least one of the first judgment unit and the second judgment unit is configured to include a unit requesting a user to select document type setting of one of a plurality of predetermined document types.

The above-mentioned image processing device may be configured so that the image processing device further comprises a resolution conversion unit converting a resolution of the image data.

The above-mentioned image processing device may be configured so that the image compression unit comprises a color difference component deleting unit resetting color differences of components of the image data to zero.

The above-mentioned image processing device may be configured so that the image processing device further comprises a black-character extracting unit extracting black characters from the image data.

In an embodiment of the invention which solves or reduces one or more of the above-mentioned problems, there is provided an image compression method which compresses image data which is created by electronizing of a document, to generate compressed image data, comprising the steps of: determining a type of document from the image data; and performing a compression encoding of the image data based on a result of the determination of the determining step.

The above-mentioned image compression method may be configured so that the determining step comprises: a first judgment step of determining whether the document is a document containing only characters or characters and line drawings; and a second judgment step of determining whether the document is a chromatic document.

The above-mentioned image compression method may be configured so that the image compression method further comprises: converting a resolution of the image data; separating the image data into binary image data and multi-level image data, based on a result of the determination of the determining step; performing a compression encoding of the binary image data; performing a compression encoding of the multi-level image data; and outputting as the compressed image data a compressed image data generated by the binary image compression encoding or the multi-level image compression encoding.

The above-mentioned image compression method may be configured so that the performing step comprises: a first image compression step including a step of separating an input image of the document into a plurality of layers, and a step of performing a compression encoding of each of the plurality of layers respectively: and a second image compression step including a step of generating a binary image from the input image, and a step of performing a compression encoding of the binary image.

The above-mentioned image compression method may be configured so that the determining step comprises: a first judgment step of determining whether the document is a document containing only characters or characters and line drawings; and a second judgment step of determining whether the document is a chromatic document, wherein, when it is determined that the document is a document containing only characters or characters and line drawings and is not a chromatic image, the second image compression step performs the compression encoding of the binary image, and otherwise the first image compression step performs the compression encoding of each of the plurality of layers respectively.

The above-mentioned image compression method may be configured so that at least one of the first judgment step and the second judgment step is configured to include a step of requesting a user to select document type setting of one of a plurality of predetermined document types.

The above-mentioned image compression method may be configured so that the image compression method further comprises a resolution conversion step of converting a resolution of the image data.

The above-mentioned image compression method may be configured so that the performing step comprises a color difference component deleting step of resetting color differences of components of the image data to zero.

In an embodiment of the invention which solves or reduces one or more of the above-mentioned problems, there is provided a computer-readable image compression program which, when executed by a computer, causes the computer to perform the above-mentioned image compression method.

In an embodiment of the invention which solves or reduces one or more of the above-mentioned problems, there is provided a computer-readable recording medium on which the above-mentioned computer-readable image compression program is stored.

According to embodiments of the image processing device and the image compression method of the invention, it is possible to suppress degradation of the quality of a compressed image as much as possible and it is possible to attain high compressibility.

BRIEF DESCRIPTION OF THE DRAWINGS

Other objects, features and advantages of the present invention will be apparent from the following detailed description when reading in conjunction with the accompanying drawings.

FIG. 13 is a diagram for explaining output images and operation of each resolution conversion unit for each of respective document types.

FIG. 17 is a diagram for explaining document type setting.

DETAILED DESCRIPTION OF PREFERRED EMBODIMENTS

A description will now be given of embodiments of the invention with reference to the accompanying drawings.

In the following, the terms "image data", "binary image data" and "multi-level image data" may be sometimes expressed as an image, a binary image, and a multi-level image, respectively, for the sake of convenience.

Figure 1:
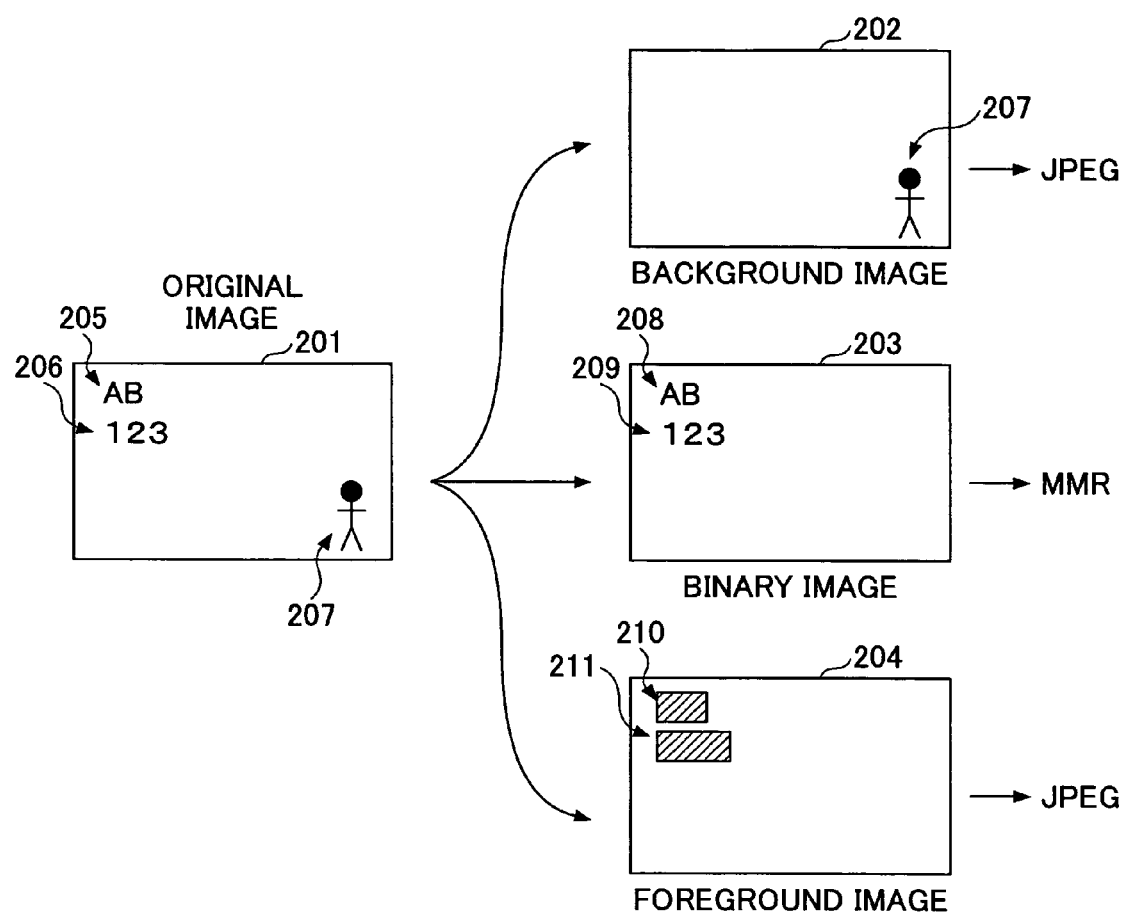
FIG. 1 is a diagram showing the composition of a highly compressed image file.

The outline of the processing of an image processing device in one embodiment of the invention will be explained. FIG. 1 shows the composition of a highly compressed image file. In FIG. 1, an original image 201, a background image 202, a binary image 203, and a foreground image 204 are illustrated.

The original image 201 shows the picture drawn on the document. In this original image 201, the characters 205 and 206 and the image 207 are shown. The "AB" of the characters 205 are taken as black characters. The "123" of the characters 206 are taken as characters described in another color than black. It is supposed that the "123" in this example are characters described in red. The image 207 is taken as a color image in the shape of a human being which is not a line drawing.

After reading the original image of the document using the scanner, the image processing device in one embodiment of the invention separates the read original image 201 into the background image 202, the binary image 203, and the foreground image 204.

The background image 202 is the image, other than characters or line drawings, which is extracted from the original image 201. The binary image 203 is the image which represents the configuration of characters and/or the configuration of line drawings, extracted from the original image 201. Since only the configuration is needed, the binary image is adequate for this image. The configuration 208 corresponds to the characters 205 and the configuration 209 corresponds to the characters 206.

The foreground image 204 is the image which represents the color of each of the configurations contained in the binary image 203. The color 210 corresponds to the color of the "AB", and in this example, it is black. The color 211 corresponds to the color of the "123", and in this example, it is red.

If an AND operation of the foreground image 204 and the binary image 203 is performed, the characters 205 and 206 of the original image 201 are obtained.

A compression encoding is performed for each of the respective images separated from the original image 201 as mentioned above. The compression methods being performed for the respective images are predetermined in consideration of the characteristics of each compression method and the characteristics of each image.

For example, the background image 202 containing only images, such as a photograph, and the foreground image 204 containing only colors are compressed by using the JPEG method. The binary image 203 is compressed by using the MMR method.

The three images are compressed in this manner, and the compressed images are combined together to generate a highly compressed image file. The size of the compressed image file is fairly smaller than the size of the image data created by electronization of the document.

Figure 2:
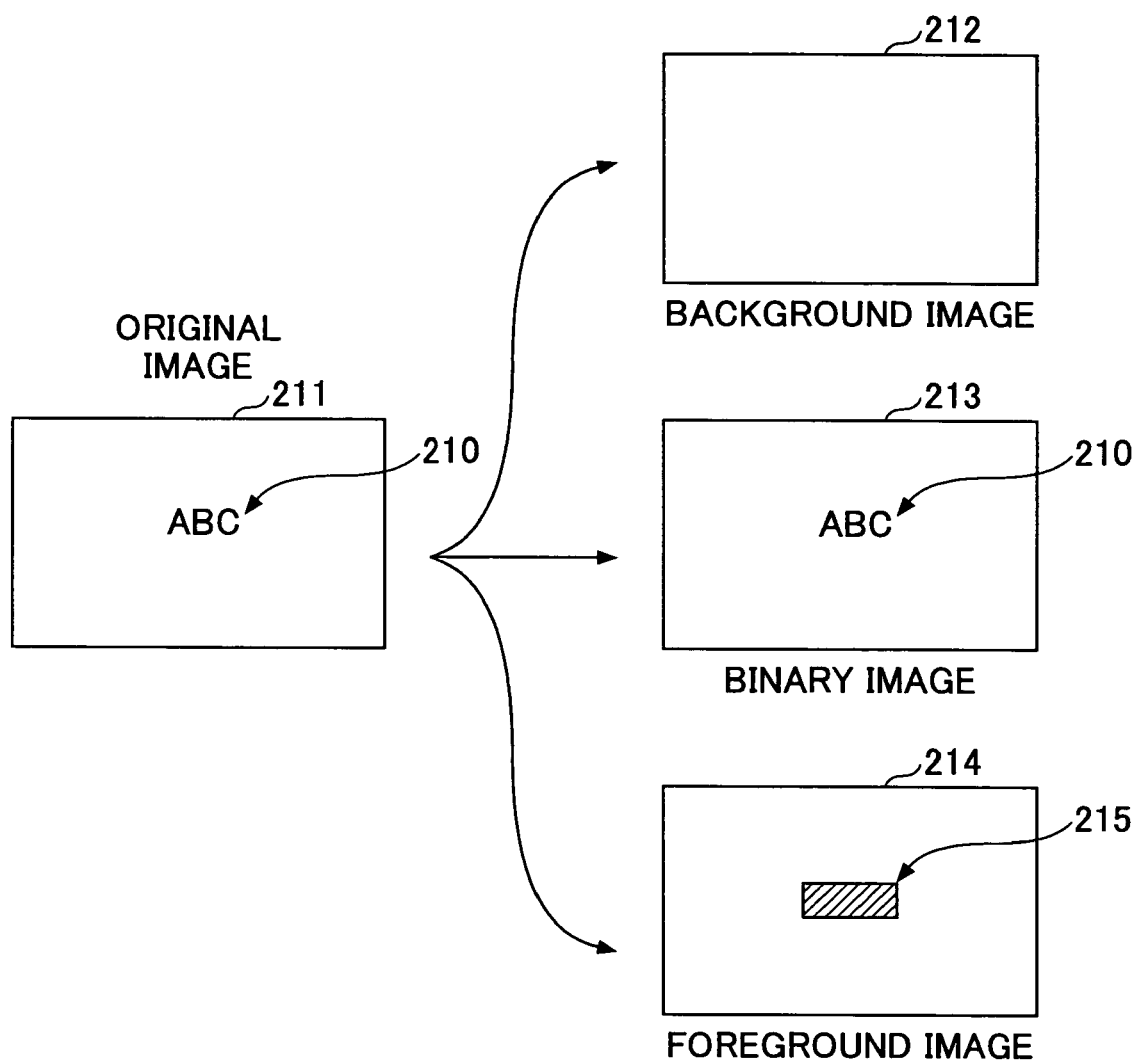
FIG. 2 is a diagram showing the composition of a highly compressed image file when the original image is an image with only black characters.

Next, the case in which an original image with only black characters as shown in FIG. 2 is compressed to generate a highly compressed image file will be explained.

In FIG. 2, an original image 211, a background image 212, a binary image 213, and a foreground image 214 are illustrated.

The original image 211 contains the characters 210. The characters 210 in this case are the black characters "ABC". If the original image is separated into three images as mentioned above, the background image 212 contains no image.

The binary image 210 becomes the image that is essentially the same as the original image 211. The foreground image 214 contains the color 215 which represents black.

In the present example, since the background image 212 and the foreground image 214 contain only the information which is substantially meaningless, there is no need to create the background image 212 and the foreground image 214. Therefore, if the original image 211 is compressed to generate a highly compressed image file that does not contain the two above-mentioned images, it is possible to further reduce the size of image data of the compressed image file.

In order to carry out the above-mentioned processing, it is necessary to determine whether characters or line drawings are contained in the original image, and determine whether the original image is a color image. Moreover, it is necessary to carry out the compression encoding using an appropriate compression method.

Next, the composition of an image processing device in one embodiment of the invention will be explained.

Figure 3:
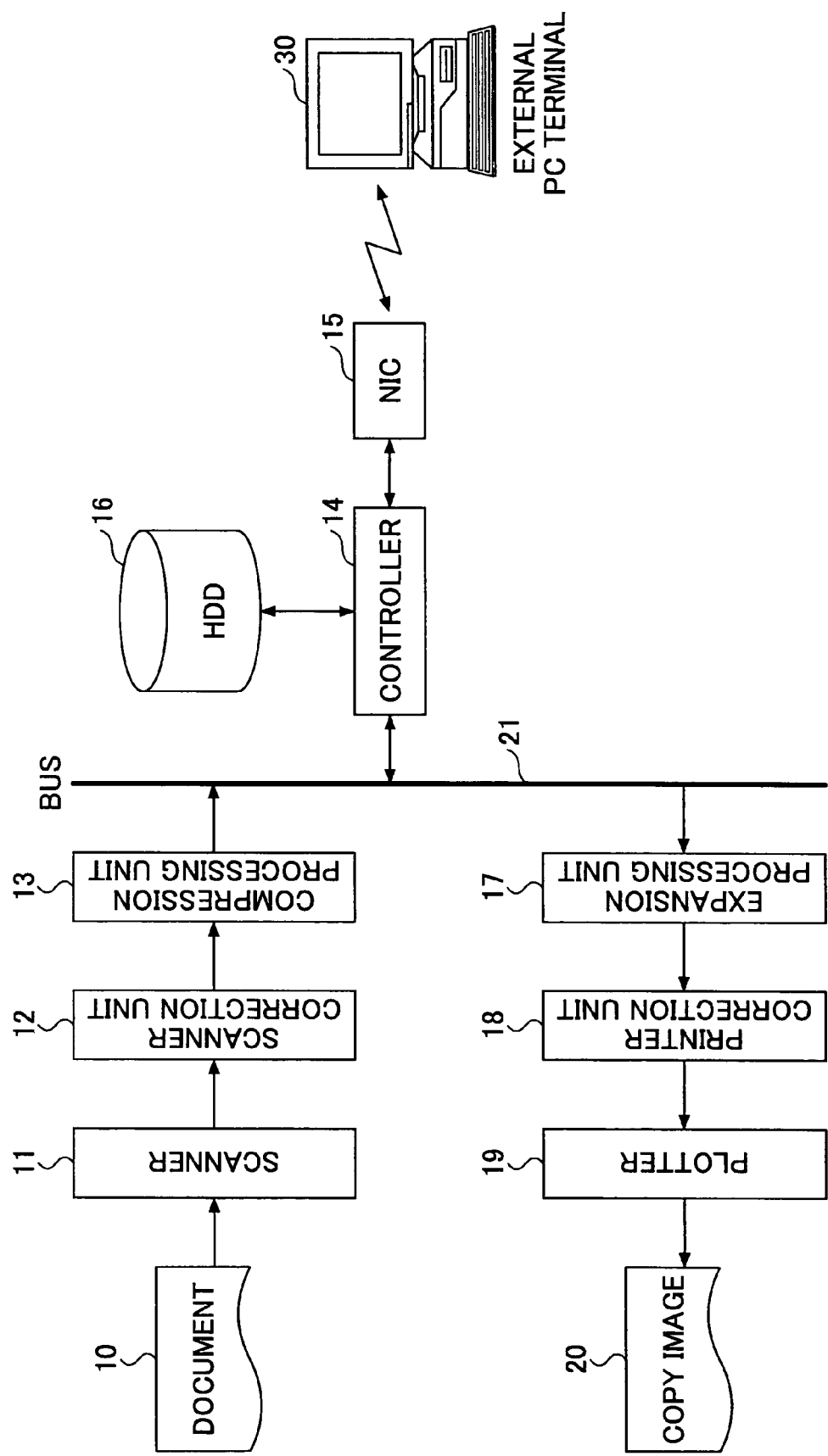
FIG. 3 is a block diagram showing the composition of an image processing device in one embodiment of the invention.

FIG. 3 shows the composition of the digital-type color image processing device in this embodiment. In FIG. 3, a document 10, a scanner 11, a scanner correction unit 12, a compression processing unit 13, a controller 14, a NIC (network interface card) 15, a HDD (hard disk drive) 16, an expansion processing unit 17, a printer correction unit 18, a plotter 19, a copy image 20, and a general-purpose bus 21 are illustrated. Also in FIG. 3, an external PC terminal 30 which is connected to the image processing device via the NIC 15 is illustrated.

When the image processing device operates as a copying machine, the scanner 11 reads image data of the document 10. The image data (analog signal) is converted into the digital data (600 dpi). The scanner 11 outputs the digital data to the scanner correction unit 12.

The scanner correction unit 12 performs the image processing of the image data (digital data) output from the scanner 11 including the area separation, and the removal of natural complexion image from the original image. The area separation is to separate the image data into the image area of characters or line drawings, the image area of photograph, etc.

The compression processing unit 13 performs a compression processing of YMCBk each 8-bit image data after scanner correction, and transmits data to via the bus.
The image data after compression pass along the bus 21, and are sent to the controller 14.

The controller 14 has the semiconductor memory which is not illustrated and stores the sent data. The image size and the read type of document are also recorded to the accumulation data as bibliographic information. Although compressed to image data, the band of the bus 21 is large enough, and as long as the capacity of the HDD 16 to store is large, data may be processed in the state of non compression.

Next, the controller 14 transmits the image data of the HDD 16 to the expansion processing unit 17 via the bus 21.

The expansion processing unit 17 decompresses the image data which have been compressed, into the original-format image data YMCK (8-bit data for each color), and transmits them to the printer correction unit 18.

In the printer correction unit 18, the gamma correction processing, the halftone processing, etc. are performed, and the correction processing of the optical density characteristics of the plotter and the graduation level conversion processing are performed.

In the graduation level conversion processing, the image data (8-bit data for each color) are converted into image data (2 bits for each color) by using the known error diffusion method or dithering method.

The plotter 19 is the copy-sheet printing unit using the laser beam writing process. The plotter 19 optically writes the 2-bit image data as a latent image to the photoconductor, so that the copy image 20 is formed on a copy sheet after the toner imaging and fixing processing.

When the image processing device operates as a distribution scanner which distributes image data to the PC via the network, the image data are passed through the bus 21, and transmitted to the controller 14. The color transform processing, the format processing, etc. are performed by the controller 14. In the gradation processing, the gray-scale-conversion processing according to the mode at the time of distribution scanner operation is performed. In the format processing, the general-purpose image format conversion to the JPEG or TIFF format is performed. Then, the image data are distributed to the external PC terminal 30 via the NIC 15.

When the image processing device operates as a printer to print out the image data transmitted to the external PC from the NIC 15 via the network, the image and the command to execute the print instruction are analyzed from the image data inputted from the NIC 15. The bit map expansion of the image data is carried out into the state where printing is possible, and the developed image data is compressed and stored. The stored data is usually written to the HDD 16 as the storage of large capacity. When storing the image data, bibliographic information of the image data is also stored in the HDD 16.

Generally, in a digital image processing device, the image of a document is read by the scanner, and the read image data is converted into digital data. At the same time, the read image data is separated into some areas which have different image features (area separation). A target pixel is determined as belonging to which of the separated areas, and, according to the result of the determination, various image processings are performed for the image data of the areas respectively. Thereby, the image quality of the output image can be raised.

Next, the composition of the scanner correction unit 12 will be explained with reference to FIG. 4.

The scanner correction unit 12 performs the image area separation based on the image data "img" (reflection factor linear) received from the scanner 11. In this embodiment, the area separation method disclosed in Japanese Laid-Open Patent Application No. 2003-259115 is utilized, and the image data is separated into the three areas: the black-character edge area, the color-character edge area, and the photograph area. By carrying out the area separation, an area separation signal (which indicates any of the black-character edge area, the color-character edge area and the photograph area) is assigned to each pixel of the image data.

Figures 4, 5:
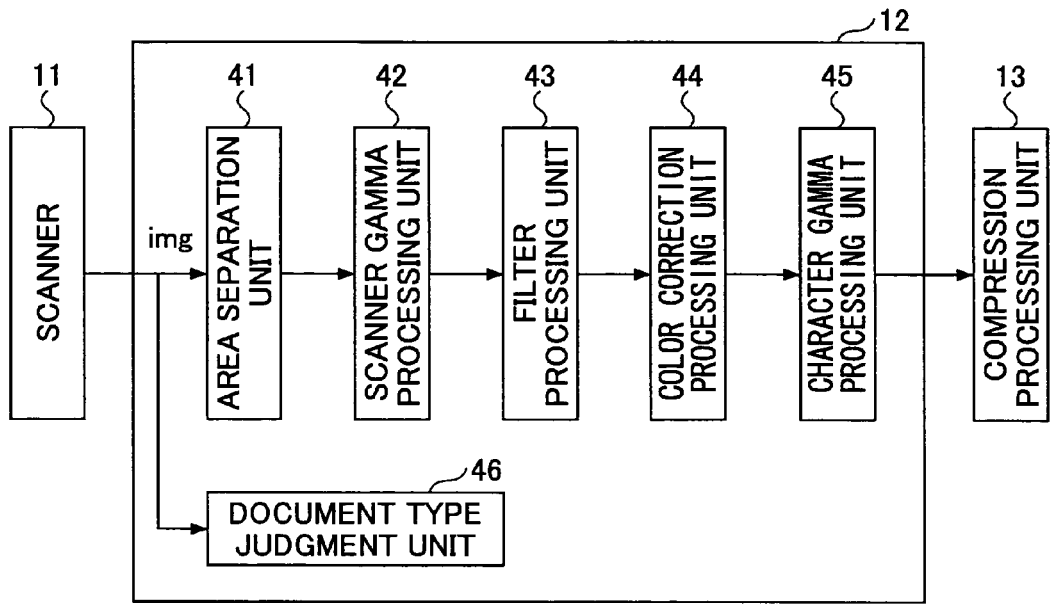
FIG. 4 is a block diagram showing the composition of a scanner correction unit.
FIG. 5 is a diagram for explaining a document type judgment.

The scanner correction unit 12 as shown in FIG. 4 comprises the area separation unit 41, the scanner gamma processing unit 42, the filter processing unit 43, the color correction processing unit 44, the character gamma processing unit 45, and the document type judgment unit 46. The area separation unit 41 corresponds to the separation unit, and the processing corresponds to the separation procedure.

The image data of reflection factor linear are converted into the image data of optical density linear by the scanner gamma processing unit 42. In the filter processing unit 43, the filter processing is switched according to the area separation signal. Specifically, the sharping processing is performed in the character areas (the black-character edge area and the color character edge area) since the readability is considered as being important. In the photograph area, the smoothing processing and the sharping processing are performed according to the edge amount by making steep optical density change in image data into the edge amount.

The steep edge is made sharp in order to make the characters in the image easy to decipher. The color correction in the color correction processing unit 44 is except a black-character edge area, and changes R, G, and B data into C, M, and Y data with a primary optical density masking method etc.

In order to raise the color reproduction of image data, UCR (under-color removal) processing of the common parts of C, M, and Y data is carried out, Bk data is generated, and C, M, Y, and Bk data are outputted.

Since the readability is not good if the black-character of a document colors in a RGB read position gap of a scanner or a black-character edge area has the heavy deviation when carrying out a printer of YMCK of a plotter, and only the black-character area is outputted with the signal equivalent to brightness by Bk monochrome data (data which C, M, and Y do not print out).

In order to improve the contrast of the character area, the gamma is processed to each of color characters and black-characters in the character gamma processing unit 45.

In the document type judgment unit 46, the document judgment block disclosed in Japanese Laid-Open Patent Application No. 2000-324338 (which is called reference 14) may be utilized. This document type judgment unit 46 corresponds to the document type judgment unit, and the processing corresponds to the document type judgment procedure.

Specifically, the character document judgment uses the method described in paragraphs 0023-0025 of reference 14, the chromatic document judgment uses the method described in paragraphs 0026-0027 of reference 14, the printing paper photograph judgment uses the method described in paragraph 0028 of reference 14, and the printing photograph judgment uses the method described in paragraphs 0029-0031 of reference 14.

The judgment for the four document types of the table shown in FIG. 5 is carried out by using the amounts of the four image features: character document, chromatic document, printing paper photograph, and printing photograph.

When the image is stored, the result of the determination is also recorded as the bibliographic information (which is equivalent to the judgment flags 1 and 2 which will be mentioned later).

The color document shown in FIG. 5 means the color document containing a photograph or a graph. For example, this corresponds to a document, such as a catalog in color. The character-only document means the color document containing only characters. For example, this corresponds to a document containing a photograph in which color characters are used, or a document containing no graph. The gray document means the gray or monochrome image document containing a photograph or a graph. For example, this corresponds to a document, such as a newspaper. The black-character document means the gray or monochrome document containing only characters. For example, this corresponds to a report document containing only characters without a photograph or a graph etc.

Next, each of the judgments described on the horizontal axis of FIG. 5 will be explained. The chromatic document judgment is a judgment of whether the original image is a color image. The character document judgment is a judgment of whether characters are contained in the original image. The printing paper photograph judgment is a judgment of whether a printing paper photograph (silver-salt film photograph) is included in the original image. The printing photograph judgment is a judgment of whether a printing photograph (dot image) is included in the original image. The gradation processing is performed and patterns, such as a copy document and an ink jet document, are classified into one of the printing paper photograph or printing photograph documents. It is possible to determine whether it is a chromatic document by this judgment to be a character or a character, and the judgment of being a document containing only a line drawing.

"YES", "NO", "–" and "YES For Either" of the table, shown in FIG. 5, show the corresponding result of the determination respectively. "YES" means that it is a document of the corresponding judgment item, and "NO" means that it is not a document of the corresponding judgment item. "–" means that, since the result of the determination does not affect the processing, there is no need for the judgment. "YES For Either" means that it is the document corresponding to either the printing paper photograph or the printing photograph.

The image processing device of this embodiment determines a type of document in accordance with the contents of the table of FIG. 5.

Next, the composition of the printer correction unit will be explained with reference to FIG. 6. The printer correction unit 18 is provided with the following elements.

Figure 6:
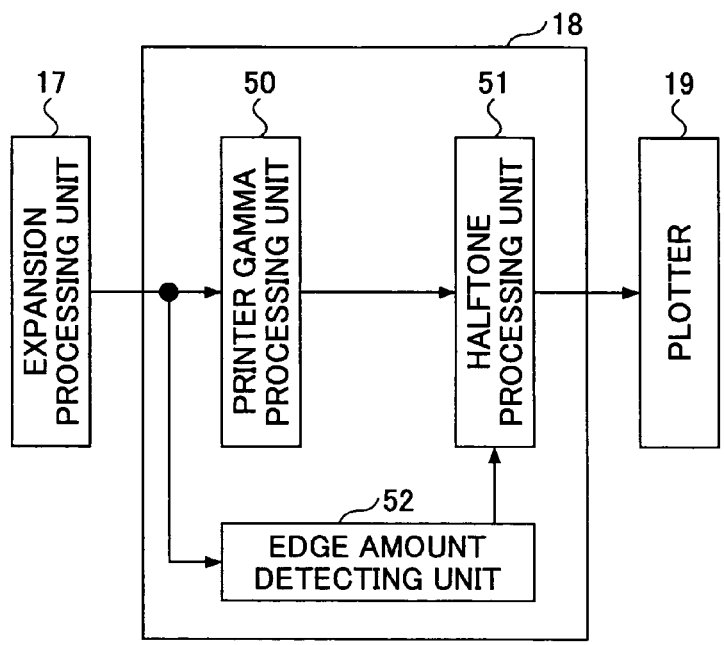
FIG. 6 is a block diagram showing the composition of a printer correction unit.

The printer gamma processing unit 50 performs the gamma correction according to the frequency characteristic of the plotter to the image data which passed through the compression processing unit 13 and the expansion processing unit 17 as shown in FIG. 6.

The halftone processing unit 51 performs quantization, such as dithering, error diffusion process, etc., and performs gray level correction. The edge amount detecting unit 52 detects the steep optical density change in the image data as the edge amount.

The printer gamma processing unit 50 performs gamma correction according to the frequency characteristic of the plotter. The halftone processing unit 51 performs the quantization, such as dithering etc., according to the gradation characteristic of the plotter and the edge amount.

When carrying out the quantization processing, the black-character signal (processing of black-character extraction mentioned later) is performed, and the contrast of black characters can also be intensified. By this function, the readability of characters improves.

Next, the composition of the controller 14 will be explained with reference to FIG. 7.

Figure 7:
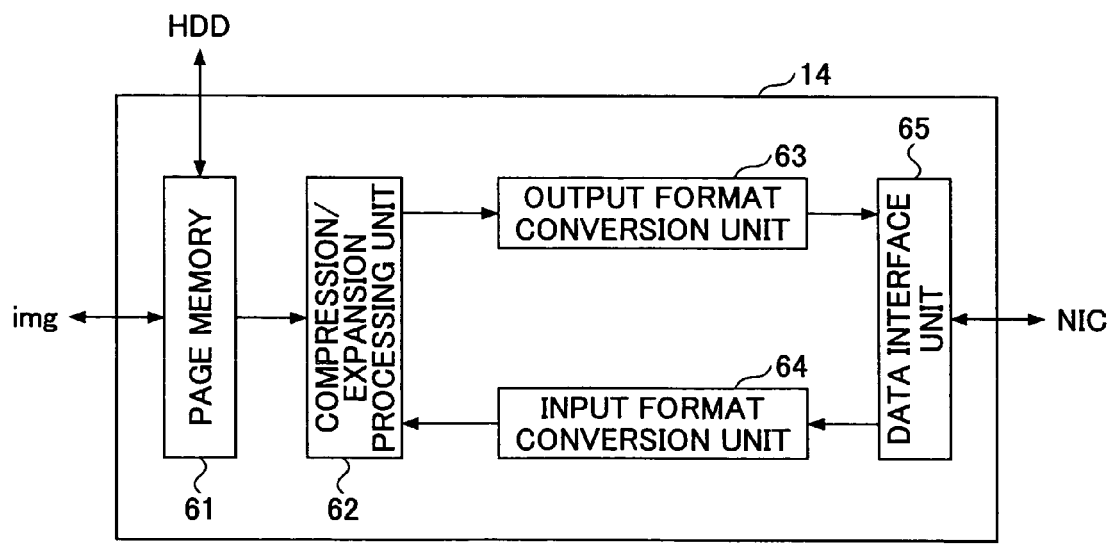
FIG. 7 is a block diagram showing the composition of a controller.

As shown in FIG. 7, the controller 14 comprises the page memory 61, the compression/expansion processing unit 62, the output-format conversion unit 63, the input-format conversion unit 64, and the data interface unit 65.

In the controller 14, the data flow which outputs the image data to the external device will be explained.

The compression/expansion processing unit 62 decompresses the image data, which is compressed and stored in the page memory 61, into the original-format color data (each color for 8 bits), and outputs them to output-format conversion unit 63.

In the output format conversion unit 63, color conversion is performed for C, M, Y, and Bk data to RGB data, simultaneously JPEG, the graphics format conversion in TIFF form, etc. are performed. In the data interface unit 65, the data of output-format conversion unit 63 is outputted to the NIC 15.

Next, the data flow which outputs the image data from external instruments, such as external PC terminal 30, to the plotter will be explained. The CPU which is not illustrated analyzes the command and writes the command directed from the outside in the page memory 61.

In the data interface unit 65, the input-format conversion unit 64, it develops to bit map data, and compresses in the compression/expansion processing unit 62, and writes image data in page memory 61. The input-format data developed is the natural image of JPEG or TIFF.

Next, the output-format conversion unit 63 will be explained with reference to FIGS. 8 through 12.

Figure 8:
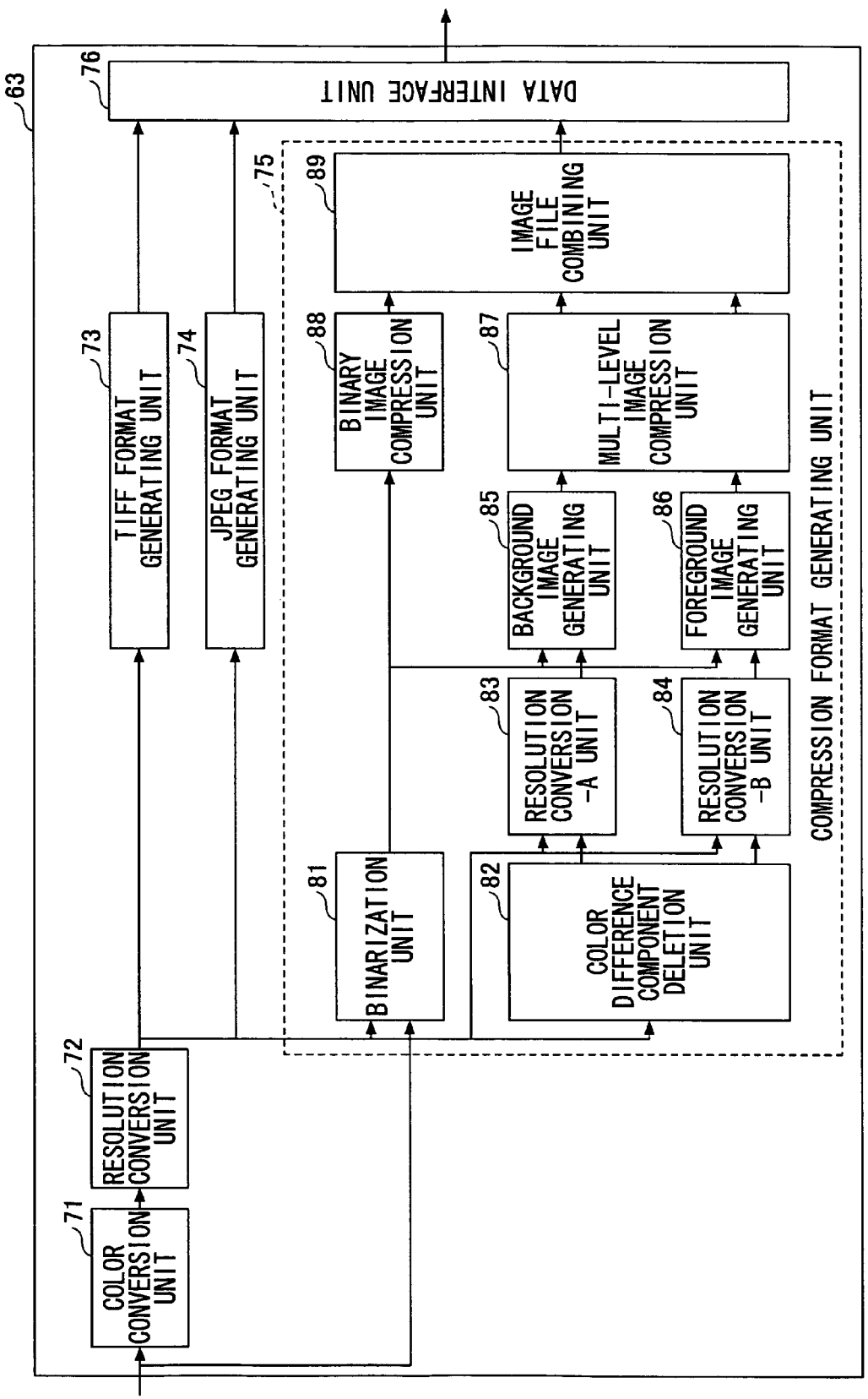
FIG. 8 is a diagram showing the composition of an output-format conversion unit.
Figure 9:
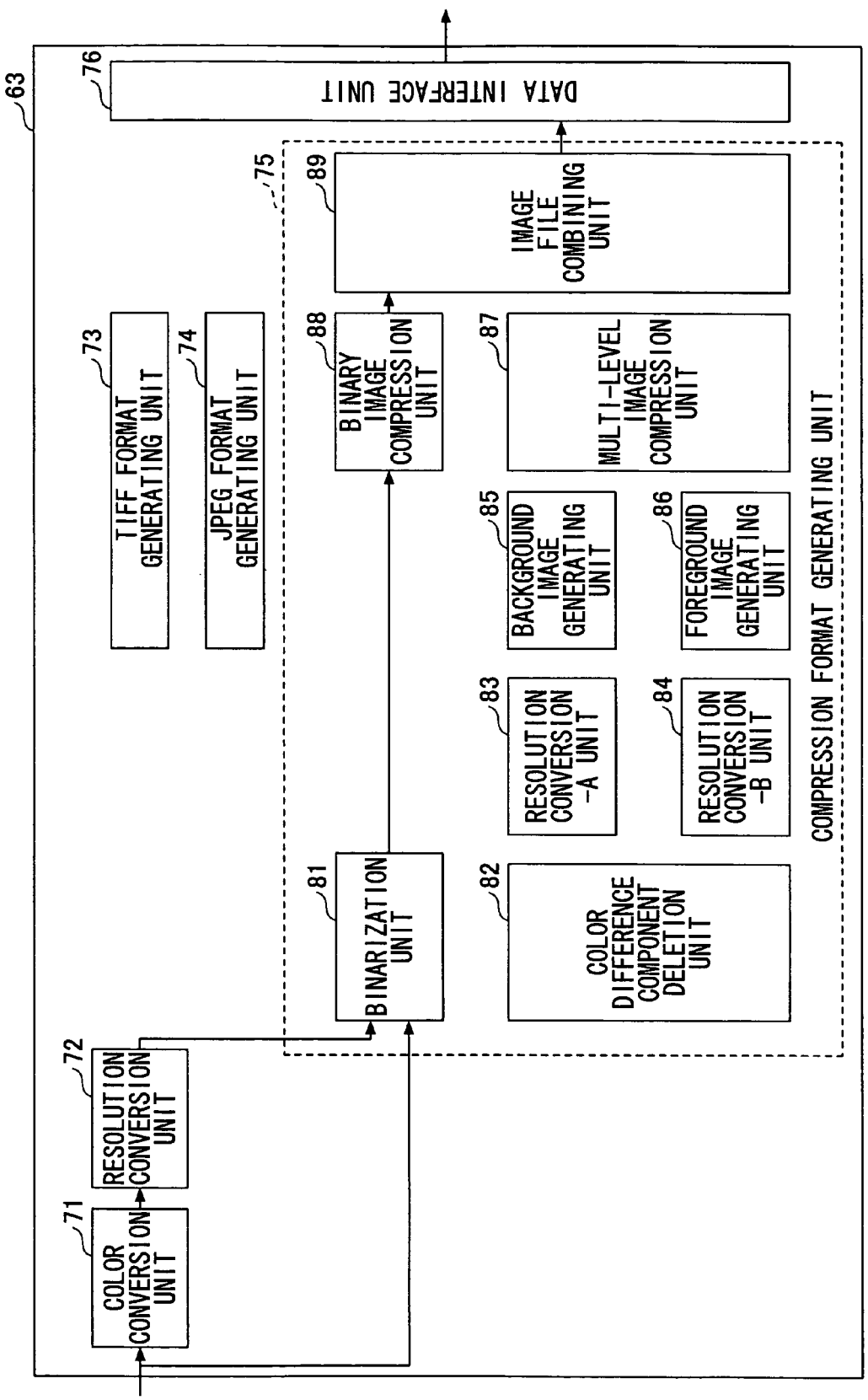
FIG. 9 is a diagram for explaining the data flow of the output-format conversion unit.
Figure 10:
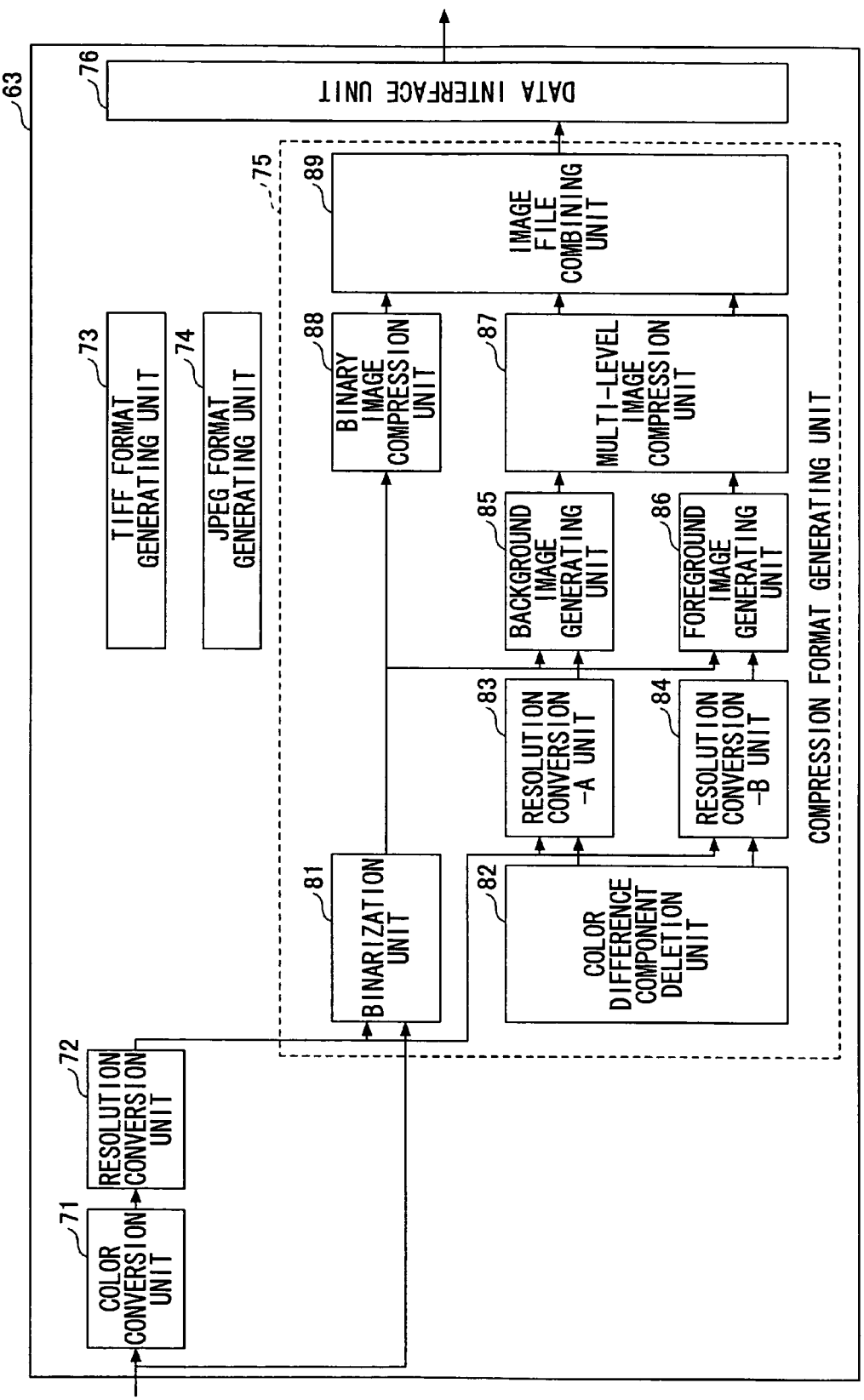
FIG. 10 is a diagram for explaining the data flow of the output-format conversion unit.
Figure 11:
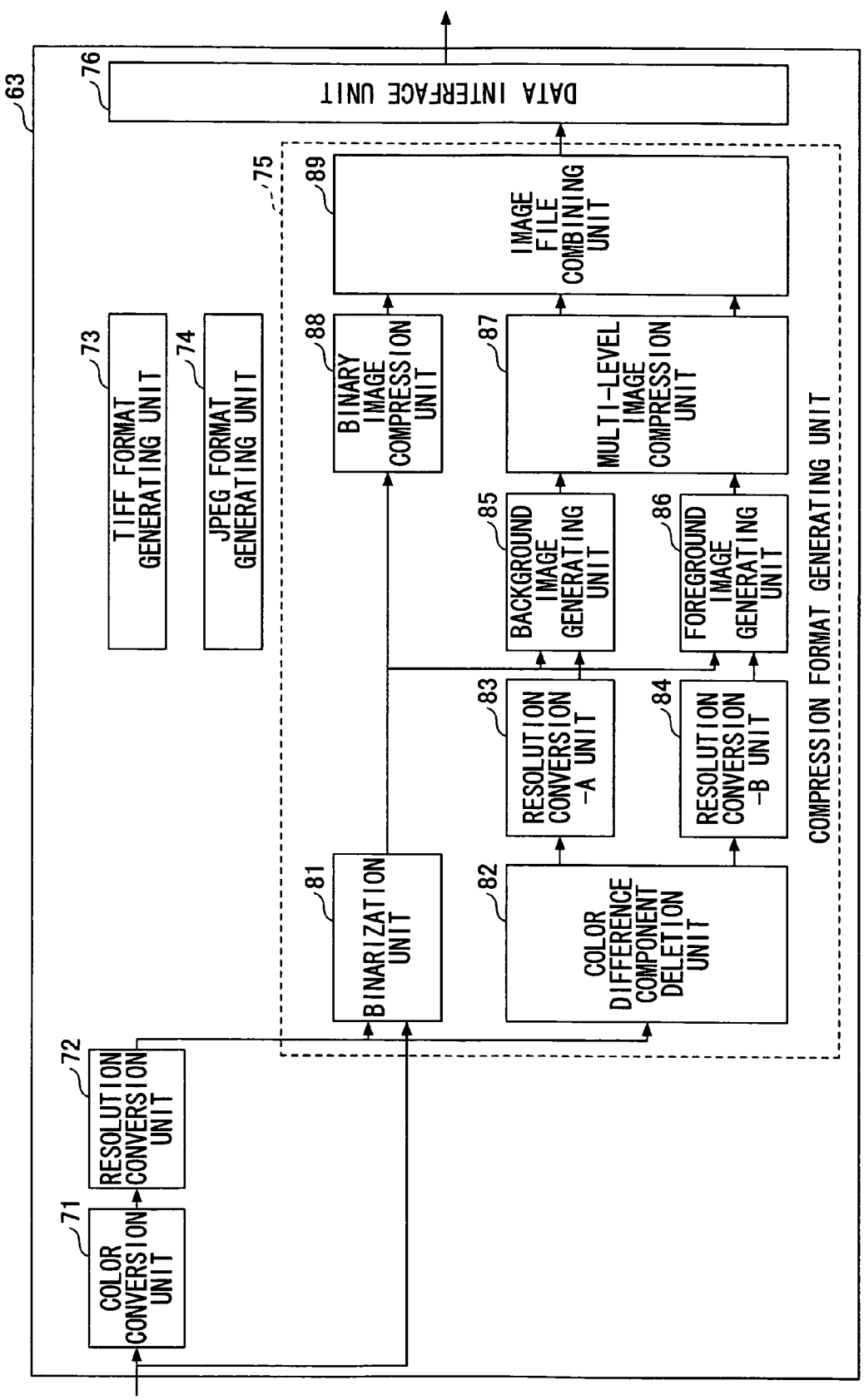
FIG. 11 is a diagram for explaining the data flow of the output-format conversion unit.
Figure 12:
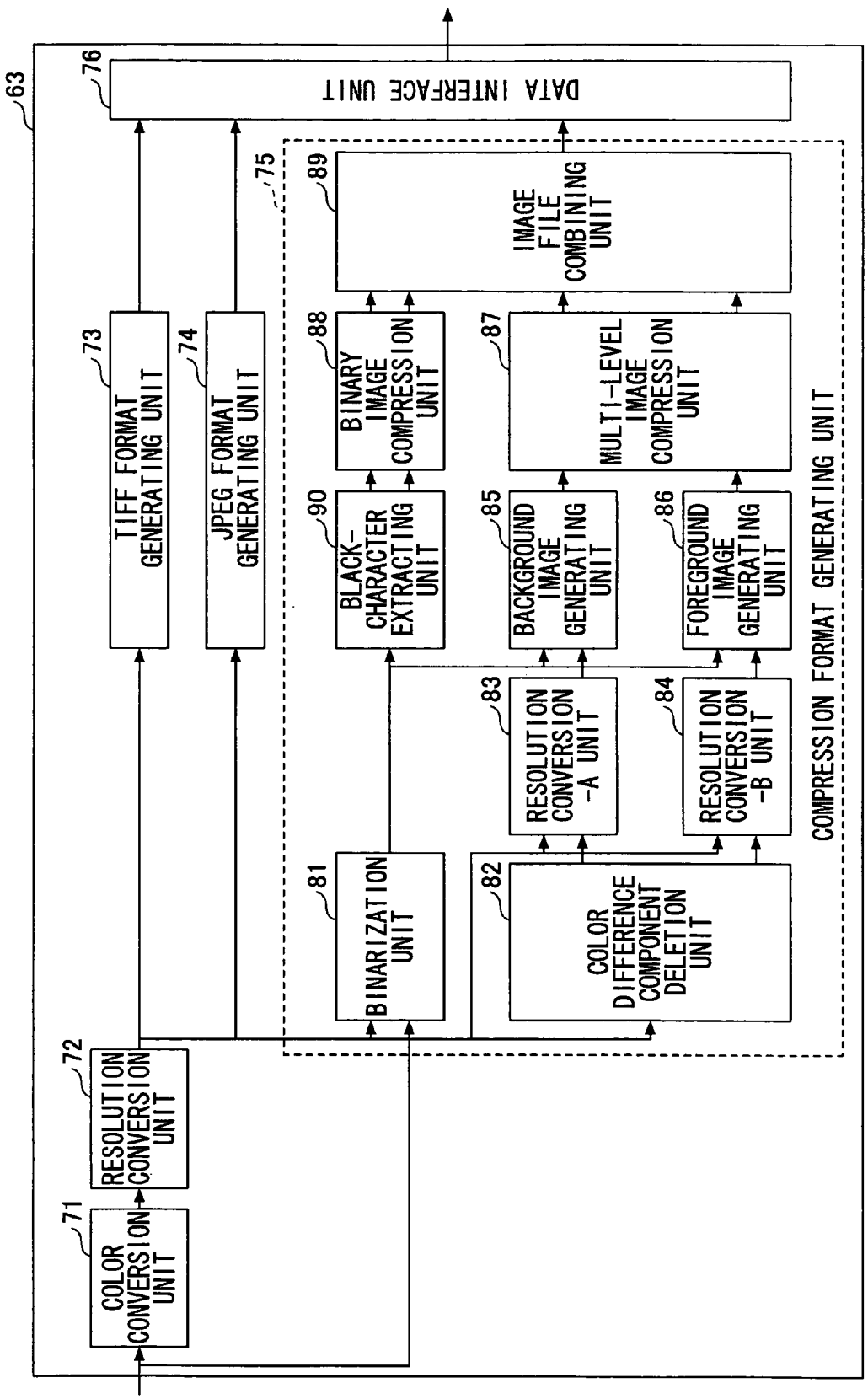
FIG. 12 is a diagram showing the composition of the output-format conversion unit of FIG. 8 to which a black-character extracting unit is added.

FIG. 8 shows the composition of the output-format conversion unit 63. FIG. 9 shows the data flow of the output-format conversion unit 63 when the document is determined to be a document with only color characters. FIG. 10 shows the data flow of the output-format conversion unit 63 when the document is determined to be a document with only black characters. FIG. 11 shows the data flow of the output-format conversion unit 63 when the document is determined to be a gray document. FIG. 12 shows the composition of the output-format conversion unit of FIG. 8 to which a black-character extracting unit is added.

In FIGS. 9 through 12, the elements which are essentially the same as corresponding elements in FIG. 8 are designated by the same reference numerals, and a description thereof will be omitted.

The composition of the output-format conversion unit of FIG. 8 will be explained. The output-format conversion unit 63 comprises the color conversion unit 71, the resolution conversion unit 72, the TIFF format generating unit 73, the JPEG format generating unit 74, the compression format generating unit 75, and the data interface (i/f) unit 76.

The compression format generating unit 75 corresponds to the image compression unit, and the processing corresponds to the image compression method. In the color conversion unit 71, data conversion is performed from YMCBk data to RGB data. The resolution conversion unit 72 performs pixel density conversion of 300 dpi, 200 dpi, etc. for the image data being converted into the RGB data. In this embodiment, it is supposed that the pixel density at the time of conversion by 300 dpi is used.

The image data by which resolution conversion was carried out are converted into each format by the TIFF format generating unit 73, the JPEG format generating unit 74, and the compression format generating unit 75, respectively.

In the data interface (i/f) unit 76, it is made the format which should be outputted to the NIC 15 and outputs. The compression format generating unit 75 comprises the binarization unit 81, the resolution conversion-A unit 83, the resolution conversion-B unit 84, the color difference component deletion unit 82, the background-image generating unit 85, the foreground-image generating unit 86, the image file combining unit 89, the binary image compression unit 88, and the multi-level image compression unit 87.

The resolution conversion-A unit 83 and the resolution conversion-B unit 84 correspond to the resolution conversion unit, and the processing corresponds to the resolution conversion procedure. The binary image compression unit 88 corresponds to the binary image compression unit, and the processing corresponds to the binary image compression procedure. The multi-level image compression unit 87 corresponds to the multi-level image compression unit, and the processing corresponds to the multi-level image compression procedure. The image file combining unit 89 corresponds to the image file combining unit, and the processing corresponds to the image file synthesis procedure.

The color difference component deletion unit 82 corresponds to the color difference component deleting unit, and the processing corresponds to the color difference component deletion procedure.

The compression format generating unit 75 changes a compression method using the result of the determination of the document type judgment unit 46 explained in FIG. 5.

The selection of a compression method will be explained with reference to FIG. 13. FIG. 13 a diagram for explaining output images and operation of each resolution conversion unit for each of the respective documents.

The "BINARY", the "BACK", and the "FORE" of the output image in FIG. 13 show that a binary image, a background image, and a foreground image are outputted respectively. The "YES" and "NO" of the resolution conversion-A unit and the resolution conversion-B unit in FIG. 13 show whether the resolution is converted or not by the corresponding resolution conversion unit, respectively.

When the document is an achromatic document and it does not contain except characters or line drawings, it is determined as being a document with only black characters. When the document is an achromatic document and it contains except characters or line drawings, it is determined as being a gray document.

Referring back to FIG. 8, the binarization unit 81 outputs the binary data which separates a character area and an ungrammatical sentence character area according to the level of the image optical density. Binarization is performed using the area separation signal which was shown in explanation of the above-mentioned scanner correction unit and which was given for every pixel.

Namely, the binarization unit 81 generates the binary image which made the black pixel the black edge character area and the color edge character area and to which it made others the white pixel. It becomes the white pixel by this generation processing except characters. Although it is only a periphery of a character, becoming a black pixel by generation processing extracts the white pixel area surrounded, for example by the black pixel, and since the interior of a character will also become a black pixel if the area is filled with black pixels, it may make it such.

The MMR compression which is reversible conversion is performed by the binary image compression unit 88.

When the document with only black characters is described in the bibliographic information of the accumulation data, as shown in FIG. 9, a character image and a background image are not generated but only a binary image is sent to an image file combining unit.

As for the document, only the document of black-character is classified to the black-characters, the background for white and the characters. In this embodiment, since the resolution of the character area in a binary image is secured, even if it expresses an image only by a binary image, there is almost no bad influence and the amount of data can be reduced.

In the resolution conversion-A unit 83 and the resolution conversion-B unit 84, the resolution of the input image is made low. For example, when describing it as the color copy at the bibliographic information of the accumulated image data, the resolution is made low to about 150 dpi.

The background-image generating unit 85 rewrites the image data of the character area to the constant equivalent to white in the binarization unit 81, and performs the JPEG compression of irreversible compression.

The foreground-image generating unit 86 also rewrites the image data of the background region to the constant, and performs the JPEG compression of irreversible compression.

The character area in the background image is made into a constant because the compressibility improves by making it the constant.

The background region in the foreground image is made into a constant because of improvement of the compressibility. By forming the resolution conversion-A unit 83 and the resolution conversion-B units 84, it becomes possible to choose the resolution which is different between the foreground image and the background image.

For example, since a character image does not need resolution like a background image, about 75 dpi is sufficient as it. When describing only the character as the document at the bibliographic information of accumulation data, resolution conversion of both a background image and the foreground image is carried out at 75 dpi, and JPEG compression of irreversible compression is performed.

In the case of a document, only a character drops resolution from a color copy because there are few bad influences to the image after composition even if it drops the resolution of the foreground image and the background image since the resolution of the character area is guaranteed with the resolution of the above-mentioned binary image.

In addition, the amount of data is made smaller than the compression method of the above-mentioned color copy by dropping resolution can be carried out.

The data flow of the output-format conversion unit of a color copy and a character document is shown in FIG. 10.

It is shown in FIG. 10 that the image data are passed along each of the resolution conversion unit, the background-image generating unit 85, and the foreground-image generating unit 86.

When describing it as the gray document at the bibliographic information of the accumulated image data, in addition to the resolution conversion, the processing which makes sexual desire news of an image only a perfect optical density value in the color difference component deletion unit 82 is performed.

It is meant only as Y of the YCbCr space called optical density value the here in color space. By this processing, the color difference component (Cb and Cr) serves as zero mostly, and can make the amount of data still smaller.

Although the amount of data was made small by dropping the resolution of a foreground image and a background image on this embodiment, a file size may be made small by such as reducing the number of gradation of an image (color number) in addition to resolution conversion of an image, reducing the information in connection with image quality.

The data flow in this case is shown in FIG. 11. In the image file combining unit 89 in FIGS. 8 through 11, the bibliographic information of accumulation data uses only the output (MMR) of the binarization unit 81 as the output image, when it is a document with only black characters.

In the case of a document and a color copy, only a gray document and a character compound the output (MMR) of the binarization unit 81, the output (JPEG) of the background-image generating unit 85, and the output (JPEG) of the foreground-image generating unit 86 into a single image file.

A general-purpose format (PDF) file may be used for such output-file format. About a document containing a photograph, you may make it the form which outputs two types of binary images and combine them into the image.

Suppose that the second type of binary images are expressed as a character binary image. The composition of the output-format conversion unit in this case becomes a form where the black-character extracting unit 90 was added as shown in FIG. 12.

The black-character extracting unit 90 extracts black-character from the output from binarization unit 81, and outputs image data to binary image compression unit 88.

The black-character extracting unit 90 corresponds to a black-character extracting unit, and that processing corresponds to a black-character extracting procedure.

Figure 14:
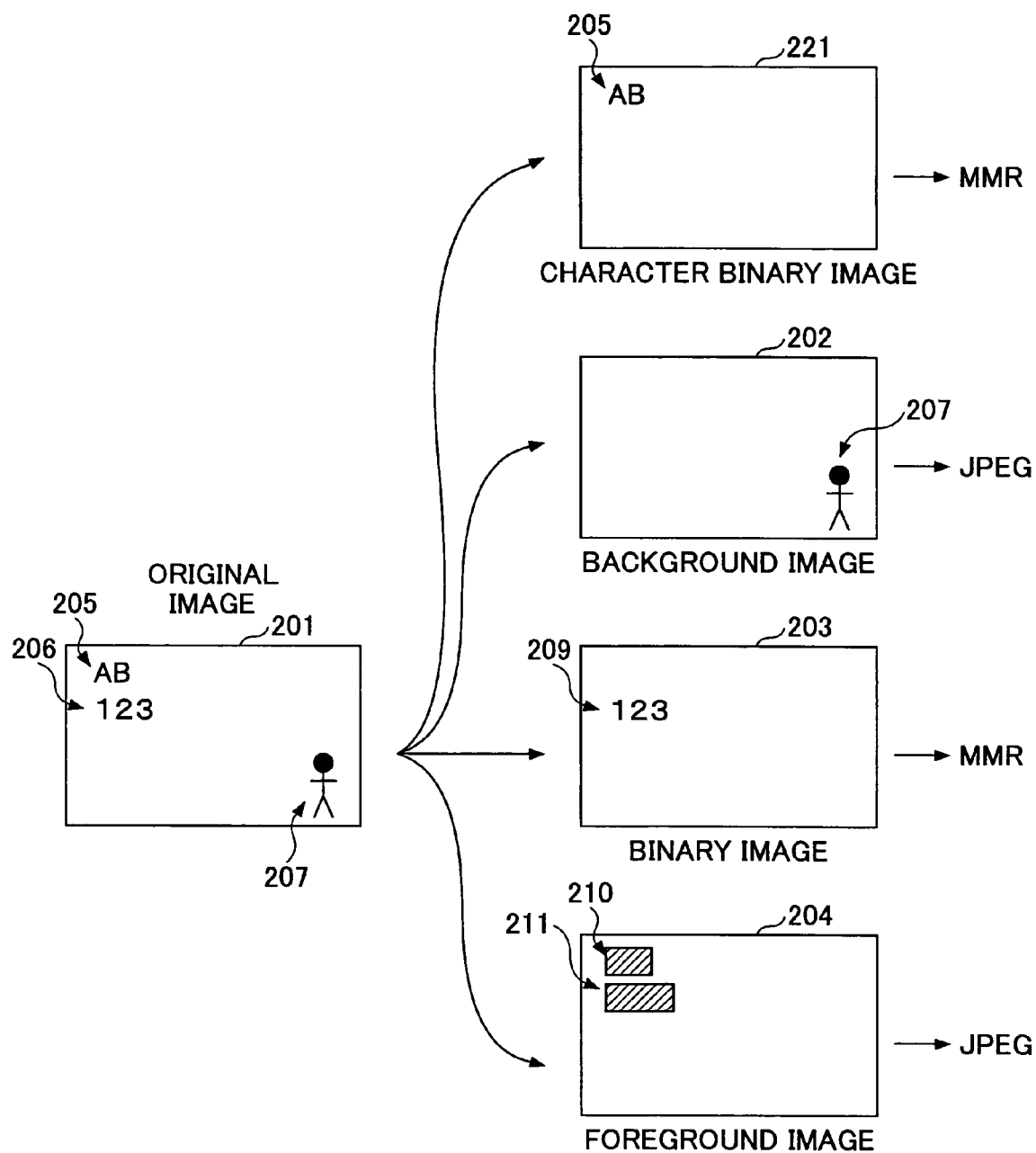
FIG. 14 is a diagram showing the composition of a highly compressed image file to which a character binary image is added.

FIG. 14 shows the composition of a highly compressed image file to which the in this case is shown in FIG. 14. In addition to the composition explained in FIG. 1, character binary image 221 was added to FIG. 14.

Since the characters 205 are black-characters as FIG. 1, it will be expressed not by the binary image 203 but by the new character binary image 221. The character binary image 221 is compressed according to the MMR method.

If the binary image which contains only black-characters mentioned above is outputted and combined, since it is printed with a black toner at the time of printing, a black character will be expressed in the paper distinctly.

The judgment of black-character acquires the pixel value on the original image equivalent to the black pixels in a character binary image, for example, and if this is very close to black What is necessary is to plot the pixel as a black pixel in the binary image which consists only of black-character, and just to do the work which transposes the pixel concerned in a character binary image to white instead by the black-character extracting unit 90 of FIG. 12.

Figure 15:
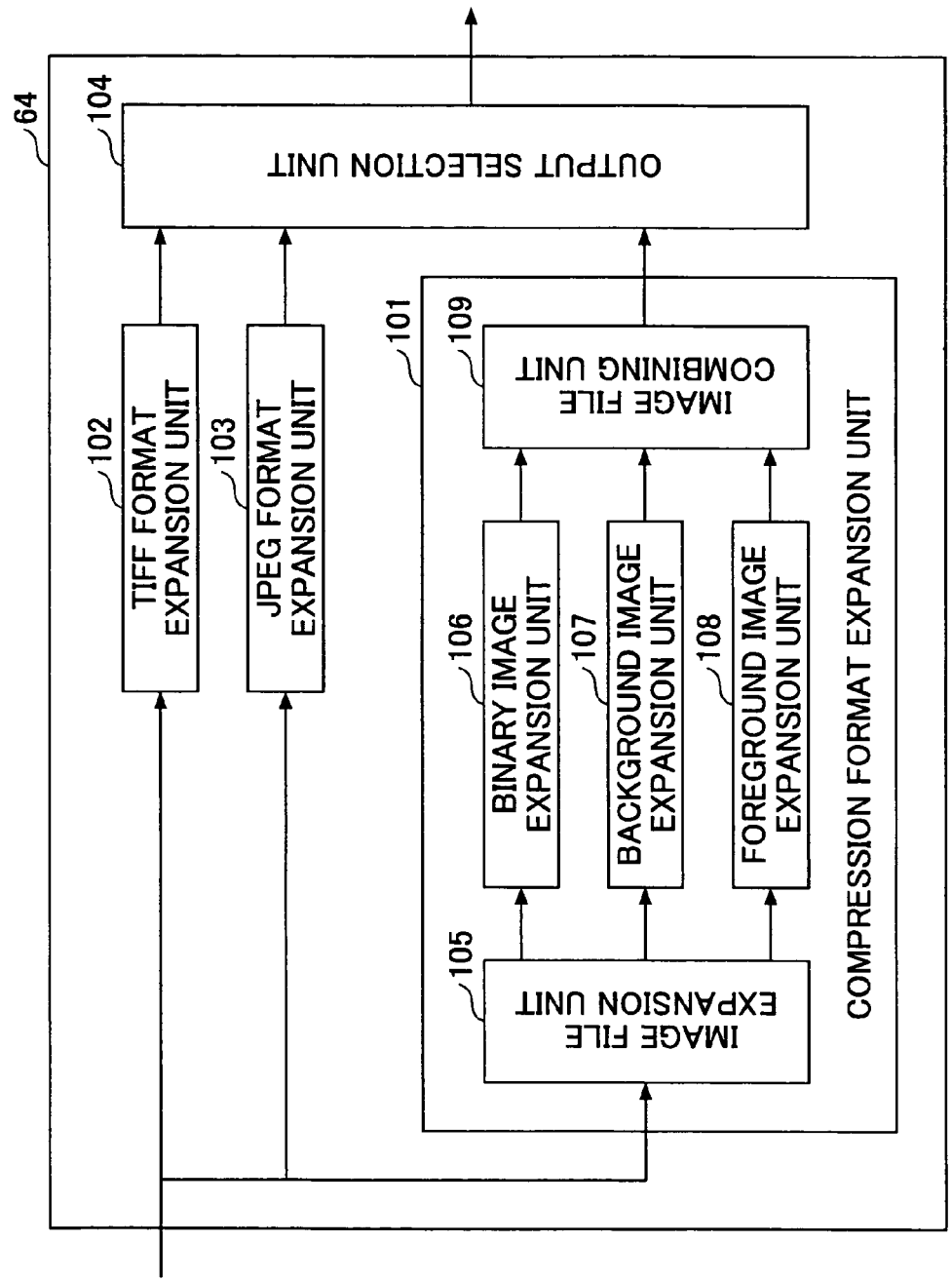
FIG. 15 is a block diagram showing the composition of an input-format conversion unit.

Next, the input-format conversion unit 64 (refer to FIG. 7) will be explained with reference to FIG. 15.

The input-format conversion unit 64 comprises the TIFF format expansion unit 102, the JPEG format expansion unit 103, the compression format expansion unit 101, and the output selection unit 104.

The TIFF format expansion unit 102, the JPEG format expansion unit 103, and the compression format expansion unit 101 have the function which develops each format to a bit map.

The output selection unit 104 chooses one of the three formats and converts RGB data into YMCBk data simultaneously with an output. If the inputted image data are TIFF formats, bit map data will develop by TIFF format expansion unit 102.

If it is a JPEG format, the bit map data is formed by the JPEG format expansion unit 103. If it is a compression format, the bit map data is formed by the compression format expansion unit 101.

The compression format expansion unit 101 will be explained. The compression format expansion unit 101 comprises the image file expansion unit 105, the binary image expansion unit 106, the background-image expansion unit 107, the foreground-image expansion unit 108, and the image file combining unit 109.

In the image file expansion unit 105, the image data respectively corresponding to the binary image expansion unit 106, and the background-image expansion unit 107 and the foreground-image expansion unit 108 for the three files generated by the compression format generating unit 75 (refer to FIG. 8) are outputted.

The binary image expansion unit 106 decompresses the MMR data and develops the same to the bit map. The background-image expansion unit 107 develops the JPEG data of the background image to the bit map.

In the foreground-image expansion unit 108, the JPEG data of the foreground image is developed to the bit map.

Three developed bit map data are combined together to form the bit map data of one sheet by the image file combining unit 109. The image file combining unit 109 outputs the image data which are the outputs of the character image expansion unit 108 if the output of the binary image expansion unit 106 indicates the character area, and if the output of the binary image expansion unit 106 is the non-character area, it outputs the image data which are the output of the background-image expansion unit 107. This generates the image of one sheet. The resolution of the character area and the non-character area is converted to the resolution of the binary image.

Next, the composition of the image processing device in another embodiment of the invention will be explained with reference to FIG. 16.

It is also possible to perform the program by making the recording medium on which recorded the program which realizes processing which was mentioned above read into a computer.

Figure 16:
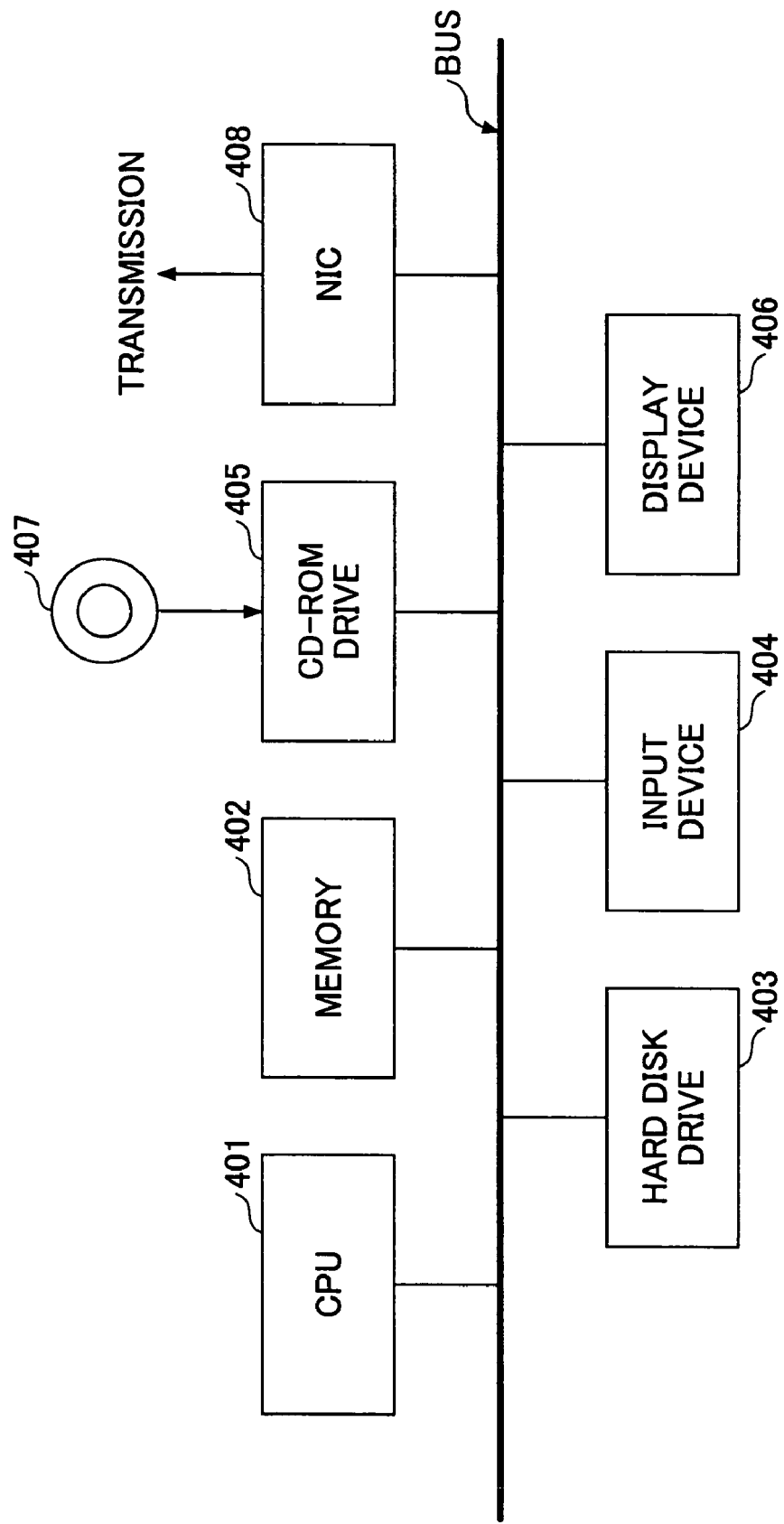
FIG. 16 is a block diagram showing the composition of an image processing device in another embodiment of the invention.

FIG. 16 shows the composition of the image processing device in that case. In FIG. 16, the CPU 401, the memory 402, the hard disk drive 403, the input unit 404, the CD-ROM drive 405, the display unit 406, and the NIC (network interface card) 408 are illustrated.

The program for realizing the image compression processing of this embodiment is stored beforehand on the recording medium 407, such as a CD-ROM. The document of the processing object is stored in the hard disk drive 403 etc., for example through the input unit 404, or it may be made to read it from the scanner (not shown).

The CPU 401 reads and executes the above-mentioned program from the recording medium 407, and the program which realizes a procedure, saves the result of the image processing in the hard disk drive 403, and if needed, it outputs to the display unit 406 or it transmits to an external device via the NIC 408.

Next, another embodiment of the invention will be explained with reference to FIGS. 17 through 19.

Also in the image processing device of this embodiment, the compression format generating unit 75 of FIG. 8 sets up an appropriate compression method according to the result of the determination of the document type judgment unit 46 mentioned above with reference to FIG. 5.

For example, the setting of the compression method is performed as shown in FIG. 17. FIG. 17 is a diagram for explaining the document type setting.

According to the result of the determination of the document type judgment unit 46, it is determined whether the document is a chromatic document or an achromatic document, and it is determined whether the document is a character-only document or a document contains only characters and/or line drawings, or it is determined whether the document is a photographic document containing a photograph, a graph, etc.

As shown in FIG. 17, when the document is a chromatic document and does not contain except characters or line drawings, the compression format generating unit 75 sets up a color compression method. When the document is an achromatic document and does not contain except characters or line drawings, it is a document with only black characters, and the compression format generating unit 75 sets up a binary compression method.

When the document is an achromatic document and does contain except characters or line drawings, it is a gray document, and the compression format generating unit 75 sets up a color compression method. When the document is a chromatic document and does contain except characters or line drawings, the compression format generating unit 75 sets up a color compression method.

In order to suppress degradation of the quality of image of an outputted image as much as possible and to choose suitable compression method, the image processing device of this embodiment uses the system which separates the input image (original image) into two or more layers, and carries out compression encoding of each separated layer, respectively.

For example, in order to separate the input image into two layers and carry out a compression encoding of each separated layer, respectively, the known separation method as disclosed in Japanese Laid-Open Patent Application No. 2005-012768 may be utilized. For example, in order to separate the input image into three layers and carry out a compression encoding of each separated layer, respectively, the known separation method as disclosed in Japanese Laid-Open Patent Application No. 2005-338902 may be utilized. For example, in order to separate the input image into four layers and carry out a compression encoding of each separated layer, respectively, the separation method described in Japanese Patent Application No. 2005-024188 (which is not yet laid-open, but assigned to the assignee of the present application) may be utilized.

Figure 18:
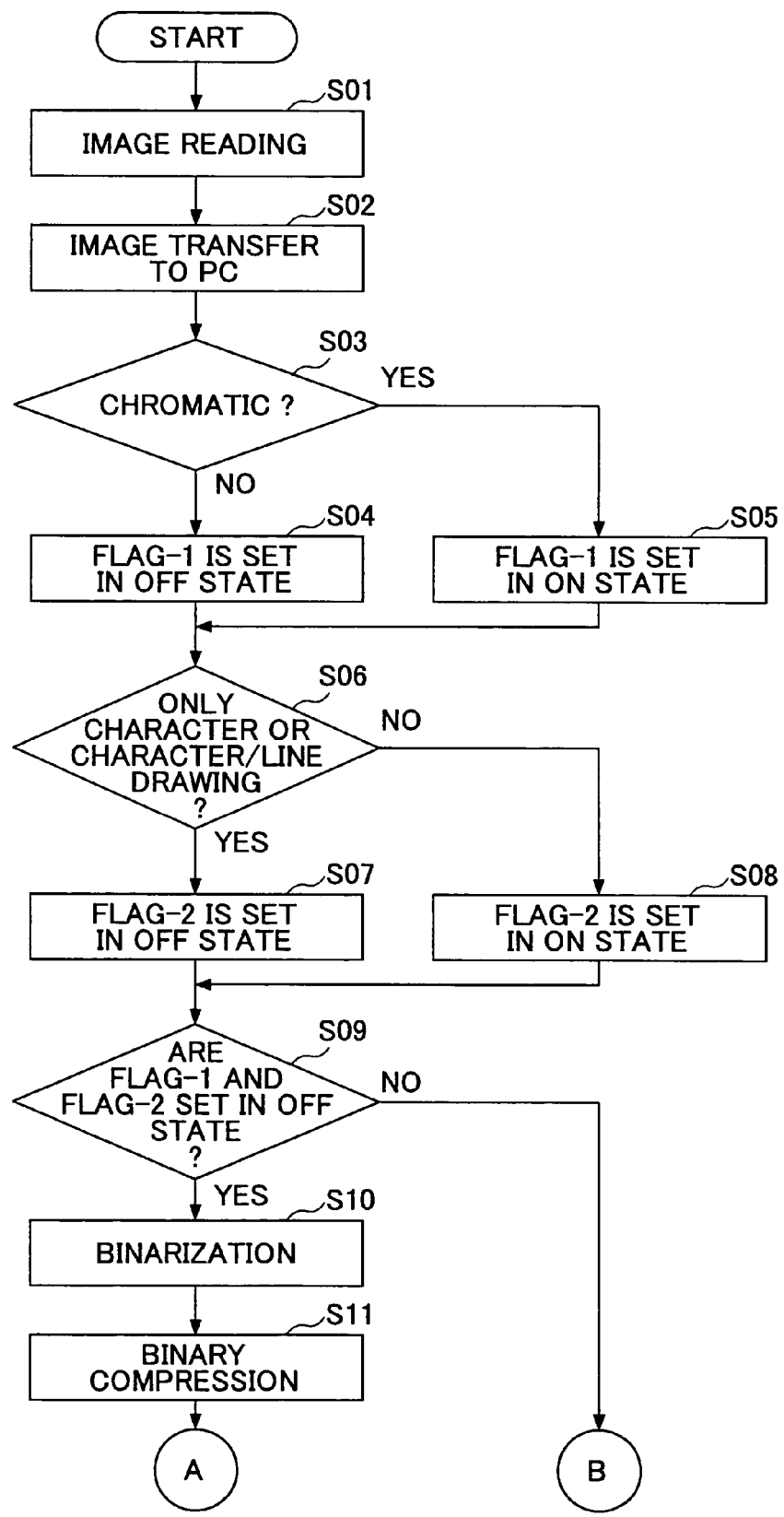
FIG. 18 is a flowchart for explaining the first half of the procedure of an image compression method in one embodiment of the invention.
Figure 19:
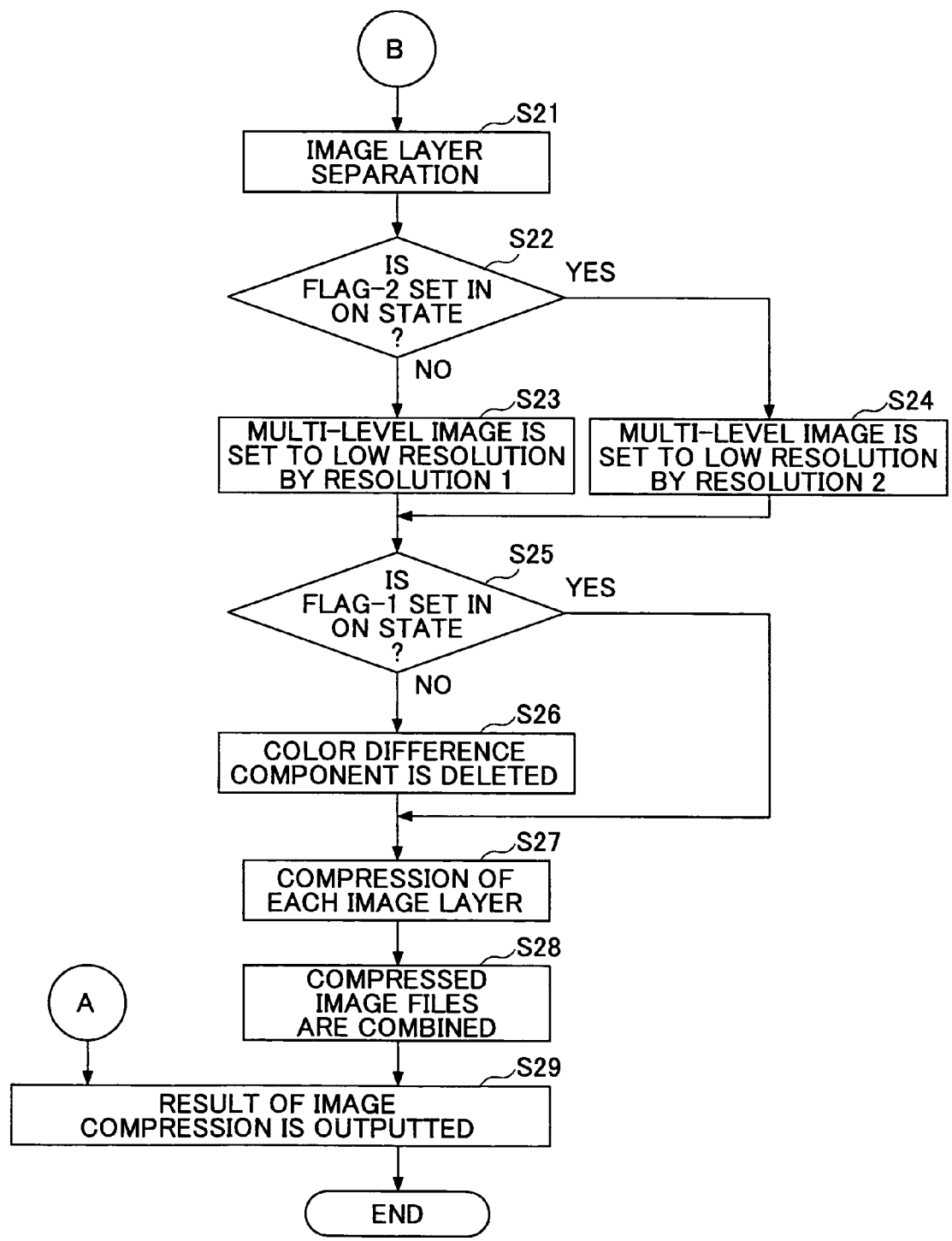
FIG. 19 is a flowchart for explaining the second half of the procedure of the image compression method of FIG. 18.

FIG. 18 and FIG. 19 are flowcharts for explaining the procedure of the image compression method in one embodiment of the invention.

For example, the procedure can be performed using the image processing device (the computer) shown in FIG. 16.

In the procedure of FIG. 18, the CPU 401 reads the document for compression as an image first using a scanner (with no illustration) (S01). Let this inputted image be a color image irrespective of the type of document in order not to spoil the sexual desire news of a document.

Next, the read image is transmitted to the memory of the image processing device (computer) (S02). The following steps are performed inside the computer.

In step S03 following step S02, the CPU 401 determines whether the document is a colorless (achromatic) document or a chromatic color. When the document is colorless, the CPU 401 sets the judgment flag 1 in OFF state (S04). When the document is chromatic, the CPU 401 sets the judgment flag 1 in ON state (S05). For this judgment, the judgment method used in the above-described embodiment may be used.

Next, in step S06, the CPU 401 determines whether the document is a document containing only characters or only characters or line drawings. When it is a document containing only characters or only characters or line drawings, the CPU 401 sets the judgment flag 2 in OFF state (S07). When it is a document containing except characters or line drawings, the CPU 401 sets the judgment flag 2 in ON state (S08).

Next, in step S09, the CPU 401 determines whether both the judgment flag 1 and the judgment flag 2 are set in OFF state. When both the judgment flag 1 and the judgment flag 2 are OFF, it means that the judgment is made such that the document is colorless and contains only characters or only characters or line drawings.

The CPU 401 performs the processing of binarization of the image data in this case (S10), and performs the compression encoding of the binary image (S11).

On the other hand, when at least one of the judgment flag 1 and the judgment flag 2 is ON, the control progresses to step S21 of FIG. 19.

In step S21 of the procedure of FIG. 19, the CPU 401 performs the layer separation process of the original image. As for this layer separation process, any of the following systems may be utilized. As mentioned above, the separation methods disclosed in Japanese Laid-Open Patent Application No. 2005-012768 and Japanese Laid-Open Patent Application No. 2005-338902 may also utilized.

In this embodiment, the separation method (which is called layer separation method 1) disclosed in Japanese Patent Application No. 2005-024188 is utilized.

Namely, using the layer separation method 1 mentioned above, the input image (original image) is separated into four layers: the color image showing the foreground (the foreground image); the color image showing the background (the background image); the binary image showing black-characters (the black-character image); and the binary image showing display image data chosen for every pixel (the character image).

In step S22 following step S21, the CPU 401 determines whether the judgment flag 2 is set in ON state. When the judgment flag 2 is OFF, this image is an image containing a photograph. If the resolution of the foreground image or the background image is reduced to a too low resolution when the above-mentioned layer separation method 1 is used, the repeatability of a photograph will deteriorate.

For this reason, the CPU 401 in this case sets the resolution of the multi-level image to the resolution 1 that is comparatively high (S23).

On the other hand, when the judgment flag 2 is ON, this image is an image which does not contain a photograph. When the layer separation method 1 is used, the resolution of characters or line drawings depends on the black-character image or the character image, and the background image and the foreground image show those corresponding colors. In this case, the color of characters or line drawings does not need a high resolution, and the CPU 401 sets the resolution of the multi-level image to the resolution 2 that is comparatively low (S24).

Namely, it is supposed that the condition: resolution 2<resolution 1 is satisfied. If the resolution is made low, the file size of the output image which created as the result of the procedure will be small.

Next, in step S25, the CPU 401 determines whether the judgment flag 1 is set in ON state. When the judgment flag 1 is OFF, this image is an achromatic image. Since the color difference remaining in the background image or the foreground image is unnecessary, the CPU 401 performs the processing which resets the color differences of the image data to zero (S26).

By performing this processing, the background image and the foreground image are converted into gray images, and the file size of the resulting output image will become small.

On the other hand, when the judgment flag 1 is ON, any special processing is not performed.

Next, in step S27, the CPU 401 performs the compression encoding of the foreground image, the background image, the black-character image, and the character image, respectively (S27). In this case, it is preferred that the JPEG compression method is used for compression of the foreground image and the background image and the MMR compression method is used for compression of the black-character image and the character image.

In step S28 following step S27, the CPU 401 combines the compressed image data of the four layers together into a single image file (S28).

In step S29 following step S11 or step S28, the CPU 401 outputs the result of the above-mentioned image processing as a result of the image compression (S29). If needed, the CPU 401 outputs the result of the image processing to the display unit 406, or transmits the same to an external device via the NIC 408.

According to the above-described procedure, it is possible to compress a document image containing a photograph or a document image which cannot be expressed as a binary image by using the compression encoding method utilizing the layer separation, while suppressing deterioration of the quality of the output image. On the other hand, when compressing a document image which can be expressed as a binary image, the compression encoding for the binary image is carried out and the file size of the output image can be reduced remarkably.

According to the image processing method mentioned above, the compression method is changed according to the type of document, and it is possible to carry out a more effective compression than the conventional image processing method using the single fixed compression method.

In the procedure of FIG. 18 and FIG. 19, the CPU automatically performs the determination as to whether the document is an achromatic document and whether it is a document containing a photograph, etc.

Alternatively, the user may be requested to specify the document type setting manually. In this case, what is necessary is just to change the steps S03-S05 and the steps S06-S08 within the procedure of FIG. 18 into the processing which requests the user to specify the document type setting.

Figure 20A:
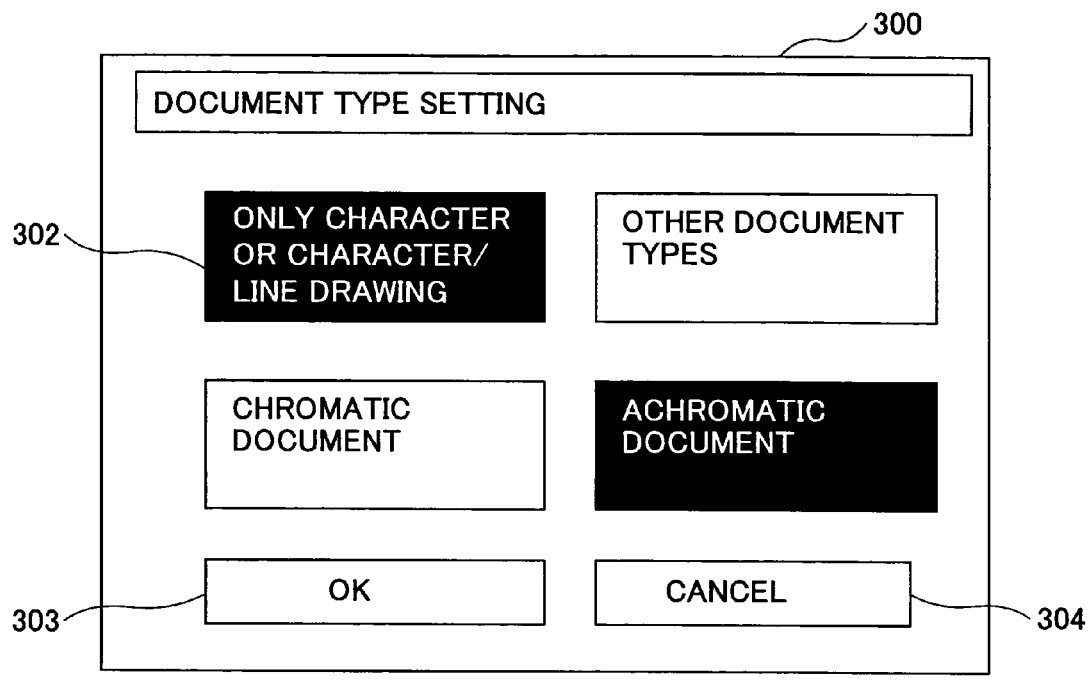
FIG. 20A and FIG. 20B are diagrams showing examples of the display screen when choosing the document type setting according to a user input.
Figure 20B:
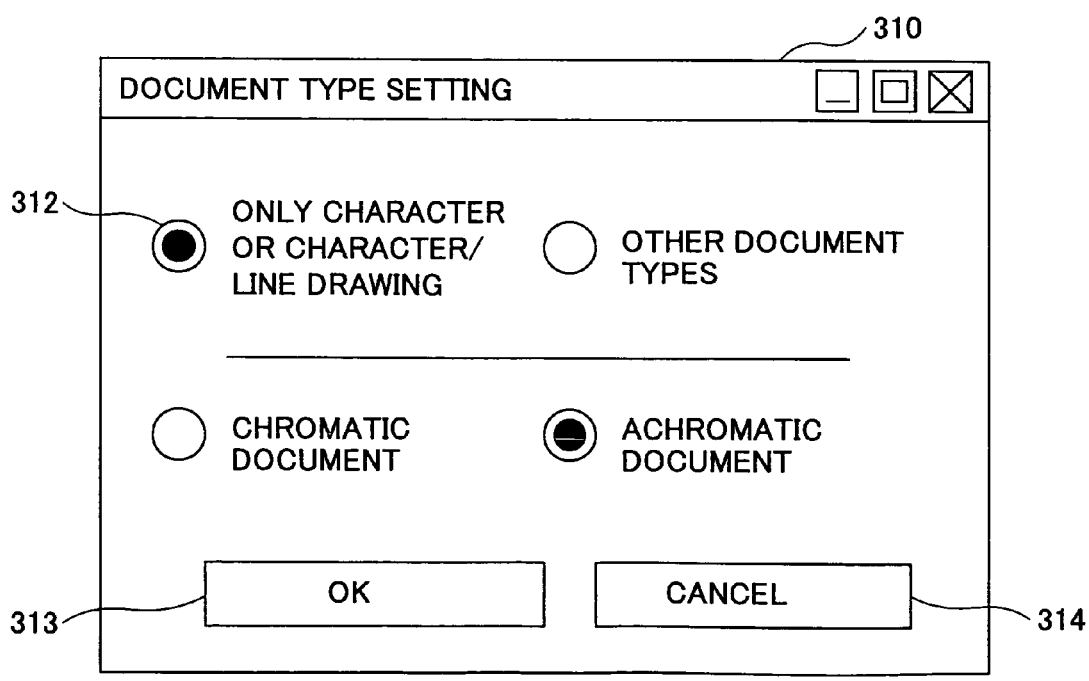

FIG. 20A and FIG. 20B show examples of the display screen when selecting the document type setting according to a user input.

The display screen including specification items required for the document type setting is displayed, and the document type setting is chosen according to a user input.

For example, FIG. 20A shows the case in which the display screen is displayed on the operation panel of a multi-function peripheral (MFP) device. As shown in FIG. 20A, the display screen 300 of the document type setting contains the plurality of specification item buttons 302. These buttons are provided for the user to choose one from among the options "only character or character/line drawing", "other document types", "chromatic document", and "achromatic document" for the type of the document inputted by the user. When the specification item button 302 which the user wishes to choose is touched, the display indication of the corresponding item is inverted on the display unit.

Suppose that the document type setting is selected by the user as shown in the display screen 300 of FIG. 20A. If the user touches the OK button 303, the CPU performs the processing which sets up ON/OFF of the judgment flags 1 and 2 according to the user input. On the other hand, if the user wishes to cancel the selected document type setting, the user touches the cancel button 304. According to the user input, the CPU performs the processing which sets up ON/OFF of the judgment flags 1 and 2.

FIG. 20B shows the case in which the above-mentioned display screen is displayed on the display unit of a general-purpose computer.

Similarly, the display screen 310 of the document type setting, as shown in FIG. 20B, contains the plurality of specification item portions 312. These portions are provided for the user to choose one from among the options "chromatic document", and "achromatic document". "only character or character/line drawing", "other document types" for the type of the document inputted by the user. When the specification item portion 312 which the user wishes to choose is clicked, the display indication of the corresponding item is inverted on the display unit.

Suppose that the document type setting is selected by the user as shown in the display screen 310 of FIG. 20B. If the user clicks the OK button 313, the CPU performs the processing which sets up ON/OFF of the judgment flags 1 and 2 according to the user input. On the other hand, if the user wishes to cancel the selected document type setting, the user clicks the cancel key 314. According to the user input, the CPU performs the processing which sets up ON/OFF of the judgment flags 1 and 2.

The user may be requested to specify directly the document type setting indicating whether the compression method using the above-mentioned layer separation, or the binary image compression method should is used. However, there may be the case where the user is not familiar enough to determine which compression method should be used.

To obviate the problem, the image processing device of the above embodiment uses the options of the specification items which are easily understandable to the user as in the display screen of FIG. 20A or FIG. 20B, and it is possible to allow the user to select an appropriate compression method according to the type of document.

The present invention is not limited to the above-described embodiments, and variations and modifications may be made without departing from the scope of the present invention.

Further, the present application is based on and claims the benefit of priority of Japanese patent application No. 2005-217559, filed on Jul. 27, 2005, and Japanese patent application No. 2006-021143, filed on Jan. 30, 2006, the entire contents of which are hereby incorporated by reference.

What is claimed is:

1. An image processing device which compresses image data which is created by electronizing of a document, to generate compressed image data, comprising:
 a scanner configured to read image data of a document;
 a first document type judgment unit configured to determine from the image data whether the document contains only characters or characters and line drawings;
 a second document type judgment unit configured to determine from the image data whether the document is a chromatic document;
 a compression format generating unit configured to set a color compression method when,
  the first document type judgment unit determines that the document contains only characters or characters and line drawings, and the second document type judgment unit determines that the document is chromatic,
  the document is a gray document, the document being a gray document when the first document type judgment unit determines that the document does not contain only characters or characters and line drawings, and the second document type judgment unit determines that the document is not chromatic, or
  the first document type judgment unit determines that the document does not contain only characters or characters and line drawings, and the second document type judgment unit determines that the document is chromatic,
 the compression format generating unit configured to set a binary compression method when the document is a black-character-only document, the document being a black-character-only document when the first document type judgment unit determines that the document contains only characters or characters and line drawings, and the second document type judgment unit determines that the document is not chromatic;
  a first image compression unit configured to perform a binary compression encoding of the image data when the compression format generating unit sets the binary compression method;
  a separation unit configured to separate the image data into binary image data and multi-level image data based on the determinations of the first and second document type judgment units; and
  a second image compression unit configured to perform a color compression encoding on the multi-level image data,
 wherein the first image compression unit is configured to perform a binary compression encoding of the binary image data, and
 at least one of the first document type judgment unit and the second document type judgment unit includes a unit configured to request a user to select a document type setting of one of a plurality of predetermined document types including an only character or character and line drawing setting, a chromatic document setting, and an achromatic setting, for selecting one of the plurality of predetermined document types.

2. The image processing device according to claim 1, further comprising:
 a resolution conversion unit configured to convert a resolution of the image data; and
 an image file combining unit configured to output as the compressed image data a compressed image data generated by at least one of the first image compression unit and the second image compression unit.

3. The image processing device according to claim 1, wherein the first image compression unit includes a binarization unit configured to generate a binary image from the input image.

4. The image processing device according to claim 3, further comprising:
 a resolution conversion unit configured to convert a resolution of the image data.

5. The image processing device according to claim 1, wherein the second image compression unit includes a color difference component deleting unit configured to reset color differences of components of the image data to zero.

6. The image processing device according to claim 1, further comprising:
 a black-character extracting unit configured to extract black characters from the image data.

7. An image compression method for an image processing device which compresses image data which is created by electronizing of a document, to generate compressed image data, comprising the steps of:
 reading image data of a document;
 determining from the image data, with a first document type judgment unit of the image processing device, whether the document contains only characters or characters and line drawings;
 determining from the image data, with a second document type judgment unit of the image processing device, whether the document is a chromatic document;
 setting a color compression method when:
  the document is determined to contain only characters or characters and line drawings, and the document is determined to be chromatic,
  the document is a gray document, the document being a gray document when the document is determined to not contain only characters or characters and line drawings, and the document is determined to be not chromatic, or
  the document is determined to not contain only characters or characters and line drawings, and the document is determined to be chromatic;
 setting a binary compression method when the document is a black-character-only document, the document being a black-character-only document when the document is determined to contain only characters or characters and line drawings, and the document is determined to be not chromatic;

performing, with a first image compression unit, a binary compression encoding of the image data when the binary compression method is set;

separating, with a separation unit of the image processing device, the image data into binary image data and multi-level image data based on the determining with the first and second document type judgment units;

performing, with the first image compression unit, a binary compression encoding of the binary image; and performing, with the second image compression unit, a color compression encoding on the multi-level image data, wherein at least one of the determining with the first and second document type judgment units includes a step of requesting a user to select a document type setting of one of a plurality of predetermined document types including an only character or character and line drawing setting, a chromatic document setting, and an achromatic setting, for selecting one of the plurality of predetermined document types.

8. The image compression method according to claim 7, further comprising:

converting, with a resolution conversion unit of the image processing device, a resolution of the image data; and outputting, with an image file combining unit of the image processing device, as the compressed image data a compressed image data generated by the binary image compression encoding or the multi-level image compression encoding.

9. The image compression method according to claim 7, wherein the first image compression step includes generating a binary image from the input image.

10. The image compression method according to claim 9, further comprising:

a resolution conversion step of converting a resolution of the image data.

11. The image compression method according to claim 7, wherein the second image compression step includes a color difference component deleting step of resetting color differences of components of the image data to zero.

12. The image compression method according to claim 7, further comprising:

a black-character extracting step of extracting, with a black-character extracting unit of the image processing device, black characters from the image data.

13. A non-transitory computer-readable medium encoded with a computer readable image compression program, wherein the program, when executed by a processor, causes the processor to execute a method according to claim 7.

14. An image processing device which compresses image data which is created by electronizing of a document, to generate compressed image data, comprising:

a scanner configured to read image data of a document;

first document type judgment means for determining, from the image data, whether the document contains only characters or characters and line drawings;

second document type judgment means for determining, from the image data, whether the document is a chromatic document;

compression format generating means for setting a color compression method when, the first document type judgment means determines that the document contains only characters or characters and line drawings, and the second document type judgment means determines that the document is chromatic, the document is a gray document, the document being a gray document when the first document type judgment means determines that the document does not contain only characters or characters and line drawings, and the second document type judgment means determines that the document is not chromatic, or the first document type judgment means determines that the document does not contain only characters or characters and line drawings, and the second document type judgment means determines that the document is chromatic, the compression format generating means for setting a binary compression method when the document is a black-character-only document, the document being a black-character-only document when the first document type judgment means determines that the document contains only characters or characters and line drawings, and the second document type judgment means determines that the document is not chromatic;

first image compression means for performing a binary compression encoding of binary image data when the compression format generating means sets the binary compression method;

separation means for separating the image data into binary image data and multi-level image data based on the determinations of the first and second document type judgment means; and second image compression means performs a color compression encoding on the multi-level image data of the document, wherein the first image compression means performs a binary compression encoding of the binary image data of the document, and at least one of the first document type judgment means and the second document type judgment means includes requesting means for requesting a user to select a document type setting of one of a plurality of predetermined document types including an only character or character and line drawing setting, a chromatic document setting, and an achromatic setting, for selecting one of the plurality of predetermined document types.

* * * * *